US012561891B2

(12) United States Patent
Levy et al.

(10) Patent No.: US 12,561,891 B2
(45) Date of Patent: Feb. 24, 2026

(54) GRAPHICS PROCESSORS

(71) Applicant: Arm Limited, Cambridge (GB)

(72) Inventors: Yoav Asher Levy, Ra'anana (IL); Jakob Axel Fries, Lund (SE); William Robert Stoye, Cambridge (GB)

(73) Assignee: Arm Limited, Cambridge (GB)

( * ) Notice: Subject to any disclaimer, the term of this patent is extended or adjusted under 35 U.S.C. 154(b) by 133 days.

(21) Appl. No.: 18/763,478

(22) Filed: Jul. 3, 2024

(65) Prior Publication Data

US 2025/0014259 A1 Jan. 9, 2025

(30) Foreign Application Priority Data

Jul. 7, 2023 (GB) ...................................... 2310474

(51) Int. Cl.
*G06T 15/06* (2011.01)
*G06T 1/20* (2006.01)
(52) U.S. Cl.
CPC ................ *G06T 15/06* (2013.01); *G06T 1/20* (2013.01); *G06T 2210/21* (2013.01)
(58) Field of Classification Search
CPC ... G06T 15/005; G06T 15/06; G06T 2210/21; G06T 1/60
See application file for complete search history.

(56) References Cited

U.S. PATENT DOCUMENTS

2009/0167763 A1* 7/2009 Waechter ................ G06T 15/40
345/426
2014/0071123 A1* 3/2014 Peterson ................ G06T 15/80
345/419

2020/0050550 A1* 2/2020 Muthler .............. G06F 16/9027
2020/0051314 A1 2/2020 Laine et al.
2020/0051316 A1 2/2020 Laine et al.
2020/0211259 A1 7/2020 Apodaca et al.
2021/0390757 A1* 12/2021 Muthler ............... G06T 15/005
2022/0051467 A1 2/2022 Woop et al.

(Continued)

FOREIGN PATENT DOCUMENTS

GB 2607348 A 7/2022

OTHER PUBLICATIONS

Combined Search and Examination Report Under Sections 17 and 18(3) dated Aug. 26, 2025, GB Patent Appication No. GB2510749.1.

(Continued)

*Primary Examiner* — Chante E Harrison
(74) *Attorney, Agent, or Firm* — Pearl Cohen Zedek Latzer Baratz LLP

(57) ABSTRACT

A graphics processor operable to render frames that represent a view of a scene using a ray tracing process includes a ray tracing circuit operable to test rays against a ray tracing acceleration data structure for a ray tracing process. The ray tracing circuit comprises a ray testing circuit operable to perform ray intersection tests for nodes of a ray tracing acceleration data structure and storage local to the ray testing circuit for storing data representative of one or more nodes of a ray tracing acceleration data structure for use by the ray testing circuit. Rays for testing by the ray testing circuit are selected from a pool of one or more rays to be tested based on an indication of the ray tracing acceleration data structure node or nodes that have been stored in the local storage of the ray testing circuit.

19 Claims, 12 Drawing Sheets

(56) References Cited

U.S. PATENT DOCUMENTS

2022/0101591 A1 * 3/2022 Barnard ................ G06T 17/005
2022/0130097 A1 4/2022 Surti et al.

OTHER PUBLICATIONS

Combined Search and Examination Report under Sections 17 and 18(3), dated Feb. 6, 2024, GB Application No. GB2310474.8, pp. 1-6.

* cited by examiner

GRAPHICS PROCESSORS

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value (e.g. colour) for a sampling position in the frame (image) is determined based on the object(s) in the scene intersected by the ray passing through the sampling position, and the properties of the surfaces of those objects. The ray tracing calculation is complex, and involves determining, for each sampling position, a set of one or more objects within the scene which a ray passing through the sampling position intersects.

Ray tracing is considered to provide better, e.g. more realistic, physically accurate images than more traditional rasterisation rendering techniques, particularly in terms of the ability to capture reflection, refraction, shadows and other lighting effects.

When performing ray tracing, a so-called ray tracing acceleration data structure indicative of the distribution of geometry for the scene to be rendered is used to determine geometry for the scene that may be intersected by a ray. The ray tracing acceleration data structure typically comprises a plurality of nodes, with each node representing a respective one or more volumes within the scene. Rays traverse the ray tracing acceleration data structure, and are tested for intersection with the volumes represented by the nodes of the acceleration data structure.

The ray tracing acceleration data structure traversal process and ray intersection testing using that acceleration data structure may be performed, for example, by means of appropriate (shader) program execution in an execution core (a shader core) of the graphics processor. Additionally or alternatively, a graphics processor may be provided with a more dedicated ray tracing processing unit that acts as a hardware accelerator for performing some or all of the ray tracing acceleration data structure traversal and intersection operation (for example in association with appropriate (shader) program execution to perform an overall ray tracing process).

BRIEF DESCRIPTION OF THE DRAWINGS

The Applicants believe that there remains scope for improved arrangements for performing ray tracing using a graphics processor.

Embodiments of the technology described herein will now be described by way of example only and with reference to the accompanying drawings, in which.

Like reference numerals are used for like elements in the Figures where appropriate.

DETAILED DESCRIPTION

Figure 1:
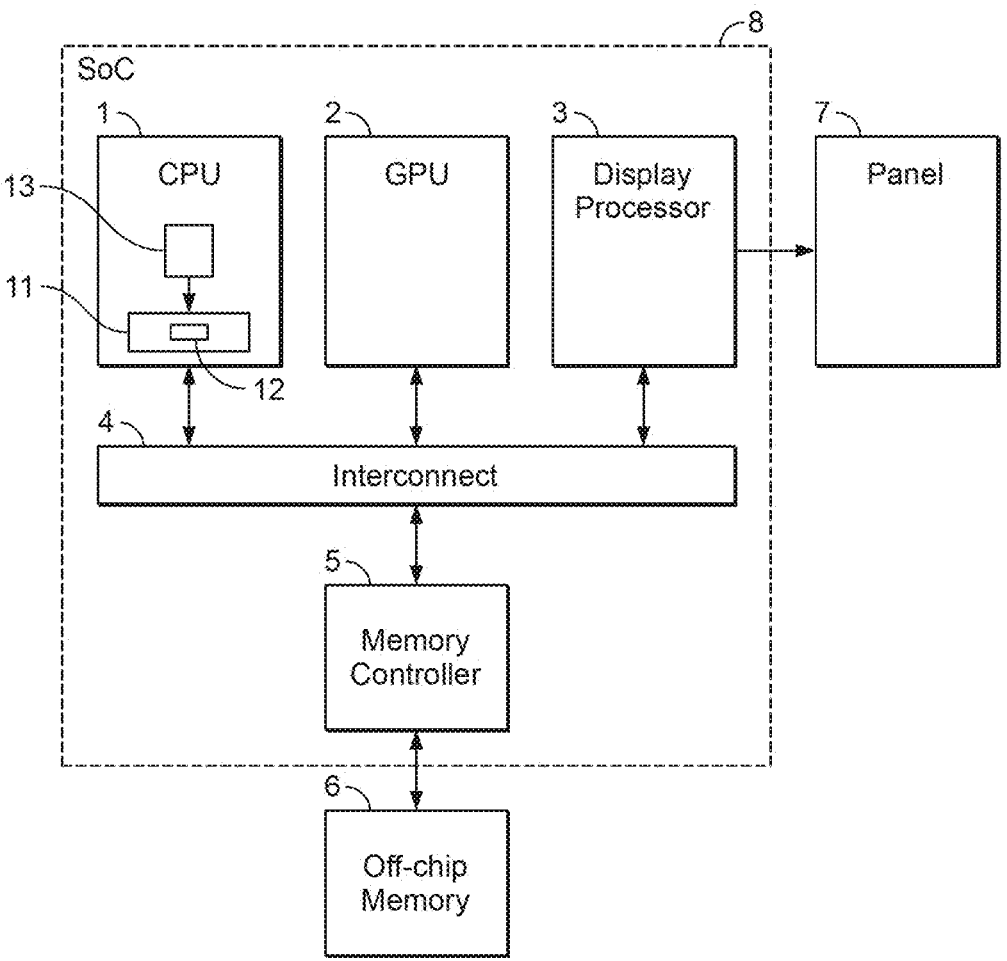
FIG. 1 shows an exemplary graphics processing system.

A first embodiment of the technology described herein comprises a method of operating a graphics processor when rendering a frame that represents a view of a scene using a ray tracing process;

wherein the ray tracing process uses a ray tracing acceleration data structure indicative of the distribution of geometry for the scene to be rendered to determine geometry for the scene that may be intersected by a ray, the ray tracing acceleration data structure comprising a plurality of nodes, each node associated with a respective one or more volumes within the scene;

the graphics processor comprising:

a ray tracing circuit operable to test rays against a ray tracing acceleration data structure for a ray tracing process;

the ray tracing circuit comprising:

a ray testing circuit operable to perform ray intersection tests for nodes of a ray tracing acceleration data structure;

storage local to the ray testing circuit for storing data representative of one or more nodes of a ray tracing acceleration data structure for use by the ray testing circuit when testing rays against a ray tracing acceleration data structure for a ray tracing process;

a ray tracing acceleration data structure node scheduling circuit operable to cause nodes of a ray tracing acceleration data structure to be stored in the local storage of the ray testing circuit for use by the ray testing circuit; and a ray scheduling circuit configured to select rays for testing against nodes of a ray tracing acceleration data structure by the ray testing circuit from a pool of one or more rays to be tested against a node of a ray tracing acceleration data structure;

the method comprising:

when the ray tracing circuit is to perform ray tracing intersection test operations for rays using a ray tracing acceleration data structure:

the ray tracing acceleration data structure node scheduling circuit causing data representative of a node or nodes of the ray tracing acceleration data structure to be stored in the local storage of the ray testing circuit;

providing an indication of the ray tracing acceleration data structure node or nodes that have been stored in the local storage of the ray testing circuit to the ray scheduling circuit; and the ray scheduling circuit:

selecting from a pool of one or more rays to be tested against the ray tracing acceleration data structure a ray or rays to be tested against a node or nodes of the ray tracing acceleration data structure by the ray testing circuit, based on the indication of the node or nodes of the ray tracing acceleration data structure that have been stored in the local storage of the ray testing circuit; and causing the selected ray or rays to be tested against a node or nodes of the ray tracing acceleration data structure by the ray testing circuit.

A second embodiment of the technology described herein comprises a graphics processor operable to render frames that represent a view of a scene using a ray tracing process;

wherein the ray tracing process uses a ray tracing acceleration data structure indicative of the distribution of geometry for the scene to be rendered to determine geometry for the scene that may be intersected by a ray, the ray tracing acceleration data structure comprising a plurality of nodes, each node associated with a respective one or more volumes within the scene;

the graphics processor comprising:

a ray tracing circuit operable to test rays against a ray tracing acceleration data structure for a ray tracing process;

the ray tracing circuit comprising:

a ray testing circuit operable to perform ray intersection tests for nodes of a ray tracing acceleration data structure;

storage local to the ray testing circuit for storing data representative of one or more nodes of a ray tracing acceleration data structure for use by the ray testing circuit when testing rays against a ray tracing acceleration data structure for a ray tracing process;

a ray tracing acceleration data structure node scheduling circuit configured to cause nodes of a ray tracing acceleration data structure to be stored in the local storage of the ray testing circuit for use by the ray testing circuit; and a ray scheduling circuit configured to select rays for testing against a ray tracing acceleration data structure by the ray testing circuit from a pool of one or more rays to be tested against a node of a ray tracing acceleration data structure;

wherein:

the ray tracing acceleration data structure node scheduling circuit is configured to, when the ray tracing circuit is to perform ray tracing intersection test operations for rays using a ray tracing acceleration data structure, cause data representative of a node or nodes of the ray tracing acceleration data structure to be stored in the local storage of the ray testing circuit;

the graphics processor further comprises:

a processing circuit configured to provide an indication of the ray tracing acceleration data structure node or nodes that have been stored in the local storage of the ray testing circuit to the ray scheduling circuit; and the ray scheduling circuit is configured to:

select from a pool of one or more rays to be tested against the ray tracing acceleration data structure a ray or rays to be tested against a node or nodes of the ray tracing acceleration data structure by the ray testing circuit, based on an indication of the node or nodes of the ray tracing acceleration data structure that have been stored in the local storage of the ray testing circuit provided to the ray scheduling circuit; and cause the selected ray or rays to be tested against a node or nodes of the ray tracing acceleration data structure by the ray testing circuit.

The technology described herein relates to performing rendering using ray tracing, and in particular to the performing of the testing of rays to be traced against respective nodes of a ray tracing acceleration data structure (which represents and indicates the geometry in the scene being rendered).

In the technology described herein, an appropriate ray tracing circuit is operable to perform the ray-node intersection tests.

As will be discussed further below, the ray tracing circuit could comprise a programmable execution circuit (shader core) of the graphics processor (with the ray-node testing then being performed by means of execution of a suitable (shader) program in a programmable execution circuit (shader core) of the graphics processor), but in an embodiment the ray tracing circuit is in the form of a respective, separate, ray tracing circuit that may, e.g., and in an embodiment, be configured to perform the ray-node testing in a fixed-function manner, and that, e.g., and in an embodiment, acts as a hardware accelerator for (certain) ray tracing operations, including at least the ray-node intersection testing, and that is, e.g., and in an embodiment, associated with, and operates under the control of, a programmable execution circuit (shader core) of the graphics processor.

In the technology described herein, the ray tracing circuit includes a ray testing circuit operable to perform ray intersection tests for nodes of a ray tracing acceleration data structure that includes local storage for storing (data for) one or more respective nodes of a ray tracing acceleration data structure that rays are to be tested against.

A node scheduling circuit loads nodes of a ray tracing data acceleration structure (e.g. that is stored in (main) memory of the overall data processing system) into the local storage of the ray testing circuit for use.

The nodes that have been loaded into the local storage of the ray testing circuit are indicated to a ray scheduling circuit that is operable to select rays for testing by the ray testing circuit from a pool of rays to be tested against a ray tracing acceleration data structure (the ray tracing acceleration data structure in question). The ray scheduling circuit then selects rays to be tested by the ray testing circuit based on the indication of the nodes of the ray tracing acceleration data structure that have been loaded into the local storage of the ray testing circuit.

As will be discussed further below, the use of local storage in the ray testing circuit for storing nodes of an acceleration data structure and the selection of rays for testing based on the nodes that are stored in that local storage in the manner of the technology described herein can facilitate more efficient processing, and in particular throughput, of rays to be tested against a ray tracing acceleration data structure by the ray tracing circuit. In particular, depending upon the configuration of the ray testing circuit and the capacity and configuration of its local storage, an increased throughput of rays being tested, for example comprising the testing of plural rays in parallel, can be achieved.

Furthermore, the operation and arrangement in the manner of the technology described herein can reduce or avoid potential memory access conflicts that may arise when attempting to load nodes of a ray tracing acceleration data structure for testing, as compared to arrangements other than in the manner of the technology described herein, thereby, for example, avoiding or reducing delays and latency while appropriate node data is accessed for testing rays against. This may also be achieved without the need to use storage having a high level of simultaneous accessibility to store the ray tracing acceleration data structure (and correspondingly be achieved where the ray tracing acceleration data structure is otherwise stored in storage, such as a cache, to which access to (e.g. plural) nodes in the cache in a given processing cycle may be limited (e.g. because of the number of read ports for the storage, and/or any "banking" configuration of the storage)).

The technology described herein relates to the performing of ray tracing on a graphics processor in order to render a frame that represents a view of a particular scene. When performing a ray tracing operation, for each ray that is being used to render a sampling position in the frame that is being rendered, in order to render the sampling position, it first needs to be determined which geometry that is defined for the scene is intersected by the ray (if any).

The technology described herein uses a ray tracing acceleration data structure, such as a bounding volume hierarchy (BVH), that is representative of the distribution of the geometry in the scene that is to be rendered to determine the intersection of rays with geometry (e.g. objects) in the scene being rendered (and, in an embodiment, then renders sampling positions in the output rendered frame representing the scene accordingly).

The ray tracing operation in the technology described herein therefore generally comprises performing a traversal of a ray tracing acceleration data structure for a ray or rays that are being used for the ray tracing process, to determine whether the respective ray intersects any geometry in the scene.

The ray tracing acceleration data structures that are used in the technology described herein comprises a plurality of nodes, with each node representing a respective one or more volumes within the scene being rendered.

The ray tracing acceleration data structure(s) that are used and traversed in the technology described herein can otherwise be any suitable and desired ray tracing acceleration data structure(s) that are indicative of (that represent) the distribution of geometry for a scene to be rendered and that can be used (and traversed) to determine geometry for a scene to be rendered that may be intersected by a ray being projected into the scene, and can take any suitable and desired form.

In an embodiment the ray tracing acceleration data structure(s) comprises a tree structure, e.g. and in an embodiment comprising a plurality of end (leaf) nodes, at least some of which may represent a set of geometry (e.g. primitives) defined within the respective volume that the leaf node corresponds to, and with the non-leaf (non-end) nodes representing hierarchically-arranged larger volumes up to a root node at the top level of the tree structure that represents an overall volume for the scene in question that the tree structure corresponds to. Each non-leaf node is therefore in an embodiment a parent node for a respective set of plural child nodes, with the parent node volume encompassing the volumes of its respective child nodes.

In this case, the ray tracing acceleration data structure can thus be (and in an embodiment is) traversed by proceeding down the branches of the tree structure and testing the rays against a volume or volumes associated with a node at a first level of the tree structure to thereby determine which child nodes in the next (lower) level of the tree structure should be tested, and so on, down to the level of the respective leaf nodes at the ends of the branches of the tree structure.

Once it has been determined by performing such a traversal operation for a ray which end (leaf) nodes represent geometry that may be intersected by a ray, the actual geometry intersections for the ray for the geometry that occupies the volumes associated with the intersected end (leaf) nodes can be determined accordingly, e.g. by testing the ray for intersection with the individual units of geometry (e.g. primitives) defined for the scene that occupy the volumes associated with the leaf nodes. Once the geometry intersections for the rays being used to render a sampling position have been determined, it can then be (and in an embodiment is) determined what appearance the sampling position should have, and the sampling position rendered accordingly.

In an embodiment, the ray tracing acceleration data structure(s) comprises a bounding volume hierarchy, with the bounding volumes in an embodiment being axis aligned (cuboid) volumes. In an embodiment the ray tracing acceleration data structure(s) is a bounding volume hierarchy (BVH) tree.

Other suitable ray tracing acceleration data structures may also be used, as desired. For instance, rather than using a BVH hierarchy, where the scene is subdivided by volume on a per-geometry basis, e.g. by drawing suitable bounding volumes around subsets of geometry, e.g., and in an embodiment, such that each leaf node (volume) corresponds to a certain number of objects (geometry), the scene could instead be subdivided on a per-volume basis, e.g. into substantially equally sized sub-volumes. For example, the ray tracing acceleration data structure may comprise a k-d tree structure, a voxel (grid hierarchy), etc., as desired. It would also be possible to use 'hybrid' ray tracing acceleration data structures where the scene is subdivided in part on a per-geometry basis and in part on a per-volume basis. Various other arrangements would be possible and the technology described herein may in general be used with any suitable ray tracing acceleration data structure.

At least in the case where the ray tracing acceleration data structure is in the form of a tree structure, there will be "higher level", non-leaf, nodes that represent respective volumes of the scene and have one or more respective child nodes, representing smaller volumes of the scene (and that should be, and that are in an embodiment, encompassed within the volume that the higher level, "parent" node represents), together with one or more, and in an embodiment plural, "end" (leaf) nodes of the data structure.

Thus, in an embodiment, the ray tracing acceleration data structure(s) comprises one or more, and in an embodiment plural, higher-level, non-end, nodes that represent larger volumes of the scene (which may accordingly be referred to as "box" nodes), and that correspondingly (each) have one or more child nodes that represent smaller volumes of the scene within the volume of the parent node, and one or more end (leaf) nodes which are the end nodes in the ray tracing acceleration data structure (and thus which may not, and in an embodiment do not, have any child nodes of their own).

The leaf (end) nodes of the ray tracing acceleration data structure (i.e. the final nodes that are reached when traversing the ray tracing acceleration data structure) in an embodiment can, and in embodiments do, represent and indicate (actual) geometry in the scene being rendered.

In an embodiment, a ray tracing acceleration data structure can also indicate, e.g., and in an embodiment, at an end (leaf) node, a further ray tracing acceleration data structure that needs to be traversed (when the node in question is intersected by a ray).

For example, an initial ray tracing acceleration data structure could indicate further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects. (Thus the ray tracing traversal operation could include transitions between different ray tracing acceleration data structures, such as transitions between different levels of detail (LOD), and/or between different levels of multi-level ray tracing acceleration data structures.)

Thus, in an embodiment the end (leaf) nodes of a ray tracing acceleration data structure in the technology described herein can indicate (actual) geometry for the scene to be rendered and/or indicate a further ray tracing acceleration data structure that needs to be analysed (traversed). An end node indicating geometry for the scene may accordingly be considered to be a "primitive" or "triangle" node, with an end node that indicates a further ray tracing acceleration data structure to be traversed correspondingly being considered to be a "transform" or "transition" node.

The ray tracing acceleration data structure will store for each respective node the appropriate information for that node that will allow a ray to be tested against the node (and for the appropriate outcome depending upon the result of the testing with the node to be determined).

Thus, for a non-end, parent, node (a "box" node), in an embodiment at least an indication that the node is a non-end node (and thus that further nodes may need to be tested if a ray intersects the node), and an indication of the volume within the scene that the node relates to (encompasses), is provided (stored) for the node.

The volume for the node, may, e.g., be indicated as a (single) overall volume for the node itself (that should in that case encompass, e.g. be a bounding volume for, the volumes of all the child nodes of the node). Additionally or alternatively, the respective volumes of some or all of the child nodes could be indicated for a parent node (such that the intersection testing for the parent node could then be performed in terms of testing the volumes of each individual child node to determine which child nodes of the parent node are intersected). In this case therefore, a parent node may have associated with it a separate volume for one or more of, and in an embodiment for each of, its child nodes (and corresponding to the volume for the respective child node(s)).

For an end (leaf), node, in an embodiment at least an indication that the node is an end node (and in an embodiment, where appropriate, the type of end node), and of the volume within the scene that the node relates to (encompasses), is provided (stored) for the node. The volume for the node may, e.g., be in terms of an overall volume for the node itself.

In the case of an end node that represents geometry for the scene, then in an embodiment an appropriate indication of the geometry that the node represents is (also) provided (stored) for and in association with the node. Such an indication of the geometry that the node relates to should, and in an embodiment does, correspondingly indicate at least an appropriate volume for the geometry (so that it can be determined whether a ray intersects the geometry or not).

An end (leaf) node can represent and be indicative of geometry in any suitable and desired manner. Thus it may represent the geometry in terms of individual graphics primitives, or sets of graphics primitives, e.g. such that the end node represents a corresponding subset of the graphics primitives defined for the scene that occupies the volume that the end node corresponds to. Additionally or alternatively, an end node could represent the geometry for the scene in the form of higher level representations (descriptions) of the geometry, for example in terms of models or objects comprising plural primitives.

In the case of an end node that indicates a further ray tracing acceleration data structure to be traversed (a transform node), an appropriate indication of the further ray tracing acceleration data structure should be, and is in an embodiment, (also) provided (stored) for the node, together with an indication of any transformation that should be applied to a ray when transitioning between the different ray tracing acceleration data structures.

Other arrangements would, of course, be possible.

The ray tracing acceleration data structures that are used in the technology described herein can be generated and provided in any suitable and desired manner. For example, they may be previously determined and provided, e.g., as part of the definition of the scene to be rendered by the application that requires the graphics processing.

In an embodiment, the ray tracing acceleration data structures are generated by the graphics processor itself, e.g. based on an indication of geometry for the scene that is provided to the graphics processor, e.g. in a preliminary processing pass before the scene is rendered.

They could also or instead be generated by a CPU (e.g. host processor), e.g. based on an indication of geometry for the scene, e.g. in a preliminary processing pass before the scene is rendered.

Other arrangements would, of course, be possible.

The ray tracing acceleration data structure traversal operation for a ray in the technology described herein (to determine geometry for the scene to be rendered that may be intersected by the ray in question) can be performed in any suitable and desired manner.

The traversal process in an embodiment operates to traverse the ray tracing acceleration data structure(s) based on the position and direction of a ray, to determine whether there is any geometry in the volumes of the scene along the path of the ray (which could, accordingly, then potentially be intersected by the ray).

Accordingly, the traversal process will, and in an embodiment does, involve, for a ray that is being used for the ray tracing process, testing the ray for intersection with a volume or volumes associated with a node of the ray tracing acceleration data structure to, e.g., and in an embodiment, determine which (if any) of the associated child nodes of the node being tested is (potentially) intersected by the ray, and then subsequently testing the ray for intersection with the volume(s) associated with the (appropriate) (child) node(s) in the next (lower) level of the ray tracing acceleration data structure, and so on, down to the lowest level (end/leaf) nodes.

Once the traversal process has worked through the ray tracing acceleration data structure(s), by performing the required ray-volume intersection testing for the nodes, to determine which volumes (represented by end/leaf nodes) containing geometry may be intersected by a ray, the ray can then be further tested to determine the actual (ray-geometry) intersections (if any) with the geometry defined for the end (leaf) nodes in question. (If a ray does not in fact intersect any geometry defined for the scene, then an appropriate "miss" event may be, and is in an embodiment, determined for the ray.)

As discussed above, the ray tracing acceleration data structure traversal for a ray could comprise traversing a single ray tracing acceleration data structure for the ray, or traversing plural ray tracing acceleration data structures for the ray (e.g. in the case where an end/leaf node of a ray tracing acceleration data structure indicates a further ray tracing acceleration data structure to be traversed).

A suitable traversal record is in an embodiment maintained to track and manage which nodes should be tested during the traversal operation for a ray.

Subject to the requirements of the technology described herein, the ray-volume and ray-geometry intersection testing itself can generally be performed in any suitable way, as desired, e.g. in the normal way for such ray tracing operations and for the graphics processor and graphics processing system in question.

The determination of which geometry is intersected by a ray (or of a "miss" for a ray) is (in an embodiment) then used to determine how to continue the processing (ray tracing/ rendering) operations.

Thus, once the geometry that the rays will actually intersect (if any) (or a miss) has been determined, further processing is in an embodiment performed for the sampling position in the frame that a ray corresponds to in accordance with the (any) geometry for the scene determined to be intersected by the ray (or a miss for the ray).

In an embodiment the further processing for a sampling position in a frame that a ray corresponds to that is performed comprises one of:

triggering the tracing (casting) of a further (e.g. secondary) ray for the sampling position in question; and rendering (shading) the sampling position so as to provide an output colour value for the sampling position for the frame.

Once the ray tracing based rendering process has been completed for a sampling position, that will, and in an embodiment does, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

The overall ray tracing process (operation) for rays when rendering a scene using a ray tracing process in the technology described herein can be controlled and triggered (implemented) in any suitable and desired manner. In an embodiment, the overall ray tracing processing (operation) is performed by a programmable execution unit of the graphics processor executing a (shader) program to perform the ray tracing operation.

Thus, in an embodiment, the graphics processor comprises a programmable execution unit operable to execute programs to perform processing operations, and the ray tracing operation for rays for rendering a scene using a ray tracing process is performed, inter alia, by means of the programmable execution unit executing an appropriate program to perform the ray tracing operation. In this arrangement, respective execution threads will execute the program to perform the ray tracing operation for respective rays.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

The programmable execution unit (circuit) can be any suitable and desired programmable execution unit (circuit) that a graphics processor may contain (and that is operable to execute programs to perform processing operations).

The graphics processor may comprise a single programmable execution unit, or may have plural execution units. Where there are a plural execution units, each execution unit can, and in an embodiment does, operate in the manner of the present embodiments. Where there are plural execution units, each execution unit may be provided as a separate circuit to other execution units of the graphics processor, or the execution units may share some or all of their circuits (circuit elements).

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

Correspondingly, when executing the ray tracing shader program, the graphics processor will operate to spawn (issue) respective execution threads for the sampling positions of the frame being rendered, with each thread then executing the "ray-tracing" program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

As discussed above, as part of the ray tracing operation, it will be necessary to test a ray that is traversing a ray tracing acceleration data structure against a node or nodes of the ray tracing acceleration data structure.

This ray node testing operation (intersection testing) could be performed as part of and by the (shader) program execution itself, for example by including in the (shader) program to be executed to perform the ray tracing operation, a suitable sub-routine or routines to implement the required ray intersection testing. In this case, the programmable execution unit that is executing the (shader) program to perform the overall ray tracing operation would correspondingly act as the ray tracing circuit (and ray testing circuit) of the technology described herein.

In an embodiment, rather than the program execution performing the entire ray tracing operation, including in particular the ray intersection testing, a (separate) ray tracing circuit, that at least (and in an embodiment) includes the ray testing circuit, is provided that performs the actual intersection testing between rays and the nodes of a ray tracing acceleration data structure during a traversal.

In other words, rather than the programmable execution unit performing the full ray tracing ray intersection determination operation, at least some of that processing, and in particular (and at least) the intersection testing between the rays and the volumes and/or geometry represented by the nodes of the ray tracing acceleration data structure, is offloaded to a separate ray tracing circuit.

In this case, the ray tracing circuit of the technology described herein will comprise a separate, "dedicated", ray tracing circuit of the graphics processor (with the graphics processor accordingly comprising both a programmable execution unit and the separate ray tracing circuit).

Thus, in an embodiment, the graphics processor comprises a programmable execution circuit (unit) operable to execute programs to perform ray tracing operations, with the ray tracing circuit of the technology described herein being separate to and distinct from that programmable execution circuit.

In this case, a (the) programmable execution unit of the graphics processor is in an embodiment operable to and configured to communicate appropriately with the ray tracing circuit to trigger appropriate ray tracing acceleration data structure traversals (including ray-node intersection testing) for rays when required as part of an overall ray tracing operation, e.g., and in an embodiment, by sending (and exchanging) an appropriate message or messages to (with) the (separate) ray tracing circuit to trigger the appropriate ray tracing and ray-node test or tests.

This operation is in an embodiment achieved by including in a (shader) program that is to be executed to perform a ray tracing operation, appropriate "ray-tracing" instructions that when executed will cause the programmable execution unit to trigger an appropriate ray tracing acceleration data structure traversal by the (separate) ray tracing circuit, e.g., and in embodiments, by triggering the execution unit to send an appropriate message to the ray tracing circuit (with the execution unit sending the message when it reaches (executes) the relevant instruction in the shader program).

The communication between the ray tracing circuit(s), etc., and the programmable execution unit can be facilitated as desired. There is in an embodiment an appropriate communication (messaging) network for passing messages between the various units.

In these arrangements, there may be a single or plural (separate) ray tracing circuits, e.g. such that plural programmable execution units share a given (or a single) ray tracing circuit, and/or such that a given programmable execution unit has access to and can use plural different ray tracing circuits, as desired.

In these embodiments, the ray tracing circuit(s) of the graphics processor should be, and in an embodiment is, a in an embodiment (in an embodiment substantially) fixed-function, hardware unit (circuit) that is (more optimally) configured to perform the ray tracing acceleration data structure traversals (and in particular ray-node intersection testing) for rays. The ray tracing circuit thus in an embodiment comprises an appropriate, in an embodiment fixed function, circuit or circuits to perform the required operations (although it may comprise and have some limited form of configurability, in use, e.g. if desired).

It would be possible in this regard for the separate ray tracing (and in particular the ray testing) circuit to be configured and operable to perform only some but not all of the ray-node intersection testing required for a ray tracing acceleration data structure traversal (with other aspects of that testing being performed by appropriate shader program execution, for example). For example, the ray tracing circuit could be configured to perform ray-volume intersection testing for nodes of a ray tracing acceleration data structure, but not to perform any ray-geometry intersection testing (or vice-versa). In one embodiment, the ray tracing circuit is configured to perform (and used to perform) ray-node volume intersection testing, but not to perform any ray-geometry intersection testing.

However, in an embodiment, the ray tracing circuit (the ray testing circuit of the ray tracing circuit) is configured and operable to perform any and all forms of ray intersection testing that may be required for a ray tracing operation. Thus in an embodiment, the ray tracing circuit can perform intersection testing both with volumes for nodes of a ray tracing acceleration data structure, and with geometry for a node of a ray tracing acceleration data structure. In an embodiment, the ray tracing circuit can perform intersection testing for and in respect of any type of node that a ray tracing acceleration data structure can comprise.

In an embodiment, the ray tracing (the ray testing) circuit is configured and operable to be able to perform plural ray-node tests in parallel. This may be achieved, for example, and in an embodiment, by the ray testing circuit of the ray tracing circuit including a plurality of ray-node testing circuits (units) (pipelines), each operable to perform its own respective ray-node testing. Thus, in an embodiment (the ray testing circuit of) the ray tracing circuit comprises a plurality of ray testing units (pipelines), such that plural ray-node tests can be performed in parallel.

In this case, each respective ray testing unit is in an embodiment used to (allocated to) perform ray testing for a particular type of node that a ray tracing acceleration data structure may comprise (only). Thus there may be, for example, and in an embodiment, one or more ray testing units to be used to perform ray testing for parent (non-end/leaf) nodes (box nodes) of a ray tracing acceleration data structure (and that will e.g., and in an embodiment, be used to perform ray-volume intersection tests), together with one or more ray testing units to be used to perform ray-geometry intersection tests (and thus that will be used for intersection testing for end/leaf nodes that represent geometry of a scene to be rendered (triangle nodes)), and, where appropriate, one or more ray testing units specifically to be used to perform intersection testing for end/leaf nodes that indicate a further ray tracing acceleration data structure to be traversed (that indicate a transition between different ray tracing acceleration data structures) (transform nodes).

In these arrangements, each ray testing unit could have the same basic configuration, irrespective of the actual form of testing it is intended to be used for (and in one embodiment that is the case). Alternatively, the ray testing units could be more specifically configured (more optimally configured) for performing the particular type of intersection testing that they are intended to be used for (and in another embodiment that is the case). In this latter case, it may be that an ray testing unit may only be used for the particular form of intersection testing that it is configured for, whereas in the former case, it would be possible to potentially reallocate ray testing units for use for different types of intersection testing, if desired (and, e.g., in use).

In an embodiment, there are more ray testing units used for (and configured for) performing intersection testing for nodes of a particular type, as compared to nodes of other types. In an embodiment the ray testing circuit includes more ray testing units for performing ray-volume intersection tests for non-end (non-leaf) nodes in an acceleration data structure, as compared to for performing ray intersection tests for end/leaf nodes of a ray tracing acceleration data structure.

In an embodiment, the ray testing circuit has one (and only one) ray testing unit for performing intersection testing for end/leaf nodes that indicate geometry (for "triangle" nodes), and one (and only one) ray testing unit for performing intersection testing for end/leaf nodes that indicate a transition to a further ray tracing acceleration data structure (for "transform" nodes), and plural and in an embodiment four, ray testing units for performing intersection testing for non-end (non-leaf) nodes (for "box" nodes).

Other arrangements would, of course, be possible.

As discussed above, the ray tracing-based rendering that is performed in the technology described herein will include, inter alia, testing respective rays against nodes of a ray tracing acceleration data structure, to determine whether the ray intersects a volume associated with the node and/or geometry for the scene associated with the node.

In the technology described herein, the ray node tests are performed by the ray tracing circuit, and in particular by the ray testing circuit of the ray tracing circuit.

In order to perform the ray-node (intersection) testing for rays, both information describing the respective node of the ray tracing acceleration data structure that a ray is to be tested against, and information descriptive of the ray being tested, will be required. This information will therefore need to be, and is therefore, provided to the ray testing process (to (the ray testing circuit of) the ray tracing circuit) as appropriate, when a ray-node test is to be performed (when a ray is to be tested in respect of a node of a ray tracing acceleration data structure).

(As discussed above, the information defining a node of a ray tracing acceleration data structure that is used for this process may vary depending upon the type of node in question, but will typically, and in an embodiment, at least include an indication of a volume or volumes and/or geometry, associated with the node.

Correspondingly, a ray may be, and in an embodiment is, defined in terms of the origin (originating position (e.g. x, y, z coordinates)) for the ray that is to be tested; the direction of (a direction vector for) the ray; and a range (distance) that the ray is to traverse (the (minimum and/or maximum) distance the ray is to traverse into the scene).)

In the technology described herein, and as discussed above, the graphics processor includes storage local to the ray testing circuit for storing (data for) nodes of a ray tracing acceleration data structure to be used by the ray testing circuit when testing rays against nodes of a ray tracing acceleration data structure for a ray tracing process. Thus nodes of a ray tracing acceleration data structure will be loaded into that local storage, with the nodes (the node data) in and from that local storage then being used by the ray testing circuit when testing a ray against the node in question.

The local (node) storage of the ray testing circuit can be configured in any suitable and desired manner. In an embodiment it is in the form of a cache local to the ray testing circuit.

The ray testing circuit local node storage should be, and is in an embodiment, physically (and logically) separate from any (main) memory of the data processing system, and should be, and is in an embodiment, storage that is internal to the graphics processor (and to the ray testing circuit) that is performing the ray tracing processing and/or that can be accessed by the graphics processor (and in particular by the ray testing circuit of the graphics processor) directly (without the need for a memory access unit (e.g. DMA) and not via any bus interface (in contrast to the (main) memory)).

In an embodiment, the local node storage of and for the ray testing circuit comprises a set of one or more, and in an embodiment, plural registers in which node data can be stored and which registers can be directly accessed by the ray testing circuit (and in particular by respective ray testing units of the ray tracing circuit). In an embodiment the set of registers in effect provide and acts as a (node) cache for storing node data local to the ray testing circuit of the ray tracing circuit, and from where node data can be directly accessed (by (a ray testing unit of) the ray testing circuit) when testing a ray against a node.

The local node storage of the ray testing circuit can in an embodiment store (has entries/capacity for) a particular, in an embodiment selected, in an embodiment predetermined (and in an embodiment relatively small) number of plural nodes of a ray tracing acceleration data structure in use. For example, and in an embodiment, it may be configured to store (up to) 20 ray tracing acceleration data structure nodes. In an embodiment it is configured to store (up to) (has capacity for) 10 ray tracing acceleration data structure nodes.

The local node storage of the ray testing circuit is in an embodiment configured to be able to store any and all different types of nodes that a ray tracing acceleration data structure could comprise. It may be configured to store any combination of the different types of nodes that a ray tracing acceleration data structure can contain, but in an embodiment is configured to store up to a particular, in an embodiment selected, in an embodiment predetermined, (maximum) number of nodes of a given type. In this case, the local storage of the ray testing circuit can in an embodiment store more nodes of a particular type, such as, and in an embodiment, more parent (non-end/leaf) (box) nodes, as compared to nodes of other types (e.g., and in an embodiment, end/leaf nodes).

In an embodiment, the local node storage of the ray testing circuit can store more (and plural) parent nodes, as compared to end/leaf nodes. In an embodiment, the local node storage is configured to store a single end/leaf node that contains geometry (a single triangle node), a single end/leaf node that indicates another ray tracing acceleration data structure to be traversed (a single transform node), and a plurality of, e.g. and in an embodiment (up to) 8, parent (non-end) nodes (box nodes). In an embodiment the number of nodes of given types that can be stored by the local node storage is configured and set based on the corresponding number of nodes of different types that can be tested in parallel (e.g., and in an embodiment, the number (and type) of different ray testing units that the ray testing circuit includes).

The ray tracing acceleration data structure nodes will be, and are in an embodiment, loaded into the local node storage of the ray testing circuit from the (main) memory where they are stored, e.g., and in an embodiment, via an appropriate cache hierarchy of the overall memory system.

(As ray tracing acceleration data structures can be relatively large, and typically include a large number of nodes against which rays may potentially need to be tested, they are usually stored in main memory of the data processing system that the graphics processor is part of, and loaded therefrom appropriately for use when performing a ray tracing process.)

Thus the graphics processor in an embodiment has an appropriate interface to, and communication with memory (a memory system) of or accessible to the graphics processor, for accessing, inter alia, ray tracing acceleration data structures stored in the memory (e.g., and in an embodiment, via an appropriate cache hierarchy).

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the (local node storage of the ray testing circuit of the) graphics processor.

Correspondingly, the graphics processor is in an embodiment part of a data processing system that in an embodiment comprises (e.g. main) memory that is operable to and used to store data for ray tracing processing and that is external to the graphics processor that is performing the ray tracing processing, e.g. main memory, and that is, in an embodiment, accessed from and by the graphics processor via an appropriate memory access unit or units, and in an embodiment via one or more direct memory access (DMA) units, e.g., and in an embodiment, via a cache hierarchy (a cache system) of the overall memory system.

In an embodiment, the ray tracing circuit includes (has associated with it) a larger (ray tracing circuit) node cache into which data of nodes for ray tracing acceleration data structures are first loaded from the memory system (via an appropriate cache hierarchy (where appropriate)), and from which ray tracing circuit node cache the node data is then loaded into the local node storage (cache) of the ray testing circuit for use by the ray testing circuit when performing ray-node tests.

In this case, the node cache of the ray tracing circuit that the node data is first loaded into before loading into the local node storage of the ray testing circuit in an embodiment has capacity to store a (significantly) greater number of nodes (of data for nodes) than the local node storage of the ray testing circuit. For example, the node cache of the ray tracing circuit may comprise 256 entries (cache lines) operable to store node data (whereas the local node storage of the ray testing circuit may, as discussed above, for example have a capacity to store ten nodes only).

In an embodiment, the (larger) node cache of the ray tracing circuit is configured such that plural, and in an embodiment two, nodes can be read from it into the local storage of the ray testing circuit in parallel (in a given processing cycle) (i.e. such that plural, and in an embodiment two, nodes can be provided from the ray tracing unit node cache to the local storage of the ray testing circuit at the same time). This may be achieved in any suitable and desired manner (and the ray tracing unit node cache should correspondingly have appropriate communications interfaces, e.g. ports, to facilitate this). For example, the ray tracing circuit node cache may be arranged to have plural, e.g. two, banks, with nodes (node data) being able to be read from the different banks of the ray tracing circuit node cache in parallel.

In these embodiments, a ray tracing circuit node cache tag table is in an embodiment used to manage, and in particular to keep track of, the ray tracing acceleration data structure nodes that are stored in the ray tracing circuit node cache and to control the loading and eviction of node data in the ray tracing circuit cache.

The ray tracing circuit node cache tag table in an embodiment stores identifiers (tags) identifying the nodes (the node data) that is stored in the ray tracing circuit node cache. It accordingly in an embodiment has a plurality of entries, one for each entry (line) in the ray tracing circuit node cache.

Each node cache tag table entry in an embodiment stores appropriate identifying data (a tag) for the node(s) that is stored in the ray tracing circuit node cache entry (cache line) in question (in an embodiment in the form of a (memory) address for the node (data)). Where the ray tracing circuit node cache is configured as plural, e.g. two banks, each tag in the ray tracing circuit node cache tag table represents plural sub-entries (e.g. two sub-lines) of data in the ray tracing circuit node cache (one from each bank of the ray tracing circuit node cache).

The ray tracing circuit node cache is in an embodiment fully associative at least for tags of a particular size. In an embodiment, tags of two different sizes are supported (a lookup search can be performed on two different tag sizes), in an embodiment with one tag size being double the size of the other. In this case, the ray tracing circuit node cache is in an embodiment configured to be fully associative for tags of the larger size, and one-way associative for tags of the smaller size.

Each entry that is stored in the ray tracing circuit node cache tag table in an embodiment also stores, in addition to the identifier (tag) for the cache entry it relates to, a set of other (meta) data for the ray tracing circuit node cache entry in question, which in an embodiment indicates the state of the entry and/or other information regarding the content of the entry.

In an embodiment, each entry in the ray tracing circuit node cache tag table also stores one or more of, and in an embodiment plural of, and in an embodiment all of:

a "valid" indicator to indicate whether the entry in the node cache is currently "valid" or not;

a node type indicator, indicating the type of node (triangle, transform, or box) that is stored in the ray tracing circuit node cache entry in question;

an "exist in data store" indicator to indicate whether the corresponding node data is currently present (stored) in the ray tracing circuit node cache data store;

a "needs requesting" indicator to indicate whether the relevant node data needs to be requested and fetched into the ray tracing circuit node cache data from the memory system; and a "lock" indicator which can be set to prevent the corresponding entry in the ray tracing circuit node cache from being evicted (and is in an embodiment set when there is at least one ray in the pool requiring the node in question).

The ray tracing circuit node cache (tag table) is in an embodiment configured to be able to process plural lookups simultaneously (in parallel) and in an embodiment as many lookups simultaneously (in parallel) as there can be ray-node tests simultaneously (in parallel). In an embodiment, the ray tracing circuit node cache (tag table) is configured to be able to process four lookups simultaneously (in parallel).

The cache tags are in an embodiment mutual to all lookup requests (each request can hit/miss the entire cache tags).

The ray tracing circuit node cache (the node cache tag table) is in an embodiment configured as a non-blocking cache that can support plural, and in an embodiment up to a particular, in an embodiment selected, in an embodiment predetermined, (maximum) number of ray-node test requests that could be made, without blocking. In an embodiment the ray-tracing circuit node code is non-blocking for as many requests as the (maximum) number of rays that can be stored in the pool of rays awaiting testing (at any given time).

The nodes of a ray tracing acceleration data structure that are loaded into the node cache of the ray tracing circuit can be selected in any suitable and desired manner. In an embodiment, an indication of the nodes that are to be tested against rays in the pool of rays to be tested is used to determine and select the nodes to be loaded into the node cache of the ray tracing circuit.

Thus, in an embodiment, the ray tracing circuit of the graphics processor is operable and configured to determine and select nodes to be loaded into the ray tracing unit node cache based on an indication of the nodes that will be required for testing against rays in the pool of rays to be tested.

In an embodiment, when a ray to be tested against a node of a ray tracing acceleration data structure is to be added to the pool of rays to be tested, it is checked whether the node that the ray to be tested against is already present in the node cache of the ray tracing circuit or not (in an embodiment by performing an appropriate lookup into the ray tracing circuit node cache tag table).

When it is determined that the node that a ray to be added to the pool of rays is to be tested against is not present in the node cache of the ray tracing circuit, then in an embodiment the node in question is fetched into the node cache of the ray tracing circuit in an appropriate manner. In an embodiment this is achieved by allocating an appropriate entry in the node cache of the ray tracing circuit for storing the node in question, and then indicating that that node data needs to be fetched into the node cache of the ray tracing circuit (e.g. and in an embodiment by setting an appropriate "needs requesting" indicator in the ray tracing circuit node cache tag table (as discussed above). The system then in an embodiment operates to load the relevant node data into the node cache of the ray tracing circuit accordingly.

It will be appreciated in this regard that when a new node (new node data) is to be loaded into the ray tracing circuit node cache, it may be necessary to evict an existing node (cache line) from the node cache.

In an embodiment it is tracked whether nodes in the ray tracing circuit node cache are still required for testing against any rays in the pool, with the storing of nodes in the node cache of the ray tracing unit being controlled based on and using that tracking, and in an embodiment such that a node is (in an embodiment) only able (allowed) to be evicted and replaced in the node cache of the ray tracing circuit once there are no more rays that require testing against that node in the ray pool waiting to be tested against that node.

Thus, the node cache replacement policy is in an embodiment configured such that cache entries (nodes) are locked (in an embodiment using a "lock" indication in the node cache tag table entry as discussed above) so that they cannot be evicted from the node cache while there is a ray currently in the ray pool that is to be tested against the node in question.

Correspondingly, for any entry (node) that is not "locked" for use by a ray, a cache replacement policy is in an embodiment used to select a node (a cache entry) to be replaced (evicted).

Any suitable and desired cache replacement (eviction) policy can be used in this regard. In an embodiment a least recently used (LRU) replacement policy and in an embodiment a pseudo-least recently used (PLRU) replacement policy is used. In one embodiment, a bit PLRU policy is used, but other replacement policies such as a tree PLRU policy or a random replacement policy could be used instead if desired.

In an embodiment, the cache replacement policy supports plural misses in parallel, and in an embodiment as many misses in parallel as the (plural) number of lookups that the ray tracing node circuit cache (tag table) is configured to handle (process) in parallel (simultaneously). Thus in an embodiment, the cache replacement policy supports and is able to handle four misses in parallel.

The ray tracing circuit node cache can be configured such that any suitable and desired number of nodes can be loaded into the node cache in any given processing cycle. In the case where there are more nodes waiting to be fetched into the ray tracing circuit node cache than can be fetched in a single processing cycle, then the node(s) to be loaded in any given processing cycle can be selected from the waiting nodes in any suitable and desired manner. In an embodiment this is done using a round robin selection process (e.g., and in an embodiment, around all the nodes that the ray tracing circuit node cache tag table indicates are waiting to be fetched into the ray tracing node cache).

The ray tracing acceleration data structure nodes that are stored in the ray testing circuit local node storage ((in an embodiment) from the ray tracing circuit node cache) can be selected and determined (by the node scheduling circuit) in any suitable and desired manner.

In an embodiment this is based on those ray tracing acceleration data structure nodes whose data is stored in the ray tracing circuit node cache and/or (and in an embodiment and) whether at least one ray in the ray pool is waiting to be tested against. In an embodiment one node for a (and each) entry in the ray testing circuit local node storage is selected based on this information.

In an embodiment, the selection of the nodes whose data is loaded into the ray testing circuit local node storage uses, and is based on, one or more of, and in an embodiment all of: an indication (and in an embodiment a list) of all the triangle nodes that are currently stored in the ray tracing circuit node cache and for which there is a ray currently awaiting testing against that node in the ray pool; an indication (and in an embodiment a list) of all the transform nodes that are currently stored in the ray tracing circuit node cache and for which there is a ray currently awaiting testing against that node in the ray pool; and an indication (and in an embodiment a list) of all the box nodes that are currently stored in the ray tracing circuit node cache and for which there is a ray currently awaiting testing against that node in the ray pool.

A next node of a particular type to load into the ray testing unit local node storage is in an embodiment then selected from the relevant node indication (list), in an embodiment in a round robin manner.

Where the local node storage of the ray testing circuit has capacity to store plural nodes of a particular type (e.g. box nodes), then in an embodiment the appropriate number of nodes of that type are selected from the relevant node-type indication (list), in an embodiment in a round robin manner.

Where it is only possible to read a limited number of sets of node data (e.g. one from each bank) from the ray tracing circuit node cache into the ray testing circuit local node storage, then in an embodiment an appropriate node selection for each available bank (read port) is made from all the required nodes from that respective part (bank) of the ray tracing circuit node cache, in an embodiment in a round robin manner.

In an embodiment, the storing of nodes in the ray testing circuit local node storage is configured such that a given node should not be (and will not be) replaced in the ray testing circuit local node storage while there is at least one ray currently awaiting testing against that node in the ray pool. In an embodiment, this is achieved by indicating respective entries in the ray testing circuit local node storage as being "locked" and thus unable to be changed whilst in that "locked" state. In an embodiment the node scheduling circuit maintains a ray testing circuit local node storage "tag" table, whereby it keeps track of which ray tracing acceleration data structure nodes are currently stored in the ray testing circuit local node storage and which of those nodes (entries) are "locked".

Thus, when data for a node is loaded into the ray testing circuit local node storage, that entry in the ray testing circuit local node storage is in an embodiment indicated as being "locked", so that that node data can be retained in the ray testing circuit local node storage until there are no more rays in the ray pool to be tested against that node data.

Correspondingly, and as will be discussed further below, in an embodiment, when the last ray to be tested against a node is sent from the ray pool, that is indicated (in an embodiment) to the node scheduler) so that that entry in the ray testing circuit local node storage can be "unlocked" (and thereafter allocated a new node).

As well as having a node cache for storing (data of) nodes of a ray tracing acceleration data structure(s), the ray tracing circuit in an embodiment correspondingly has storage for storing data of rays to be tested against nodes of a ray tracing acceleration data structure. This ray storage in an embodiment stores the relevant data required for testing a ray against a node of a ray tracing acceleration data structure. The ray storage of the ray tracing circuit in an embodiment has a plurality of entries, with each entry able to store the appropriate data for a ray. Each ray data storage entry in an embodiment also has an associated validity indication, for indicating whether the entry currently stores valid ray data or not.

In an embodiment, the ray data store has a capacity to store a plurality of rays. In an embodiment the ray data store is configured such that data of plural rays can be read from the ray data store for testing by the ray testing circuit simultaneously (in parallel). In an embodiment, the ray data store is configured as plural sub-sets of entries for storing rays, with one ray being able to be read from each sub-set of the entries in the ray data store for testing simultaneously (in parallel).

Thus the ray data store of the ray tracing circuit in an embodiment has a plurality of read ports, and/or is in an embodiment configured as a plurality of respective banks (with each read port/bank corresponding to a respective sub-set of the entries (rays) in the ray data store). In an embodiment, data of four rays can be read from the ray data store in parallel.

In an embodiment, the ray data store has capacity to store a particular, in an embodiment selected, in an embodiment predetermined (maximum) number of rays. This correspondingly and in an embodiment sets the maximum number of (different) rays that can be in flight in the ray tracing circuit at any one time.

The rays that are stored in the ray data store of the ray tracing circuit can be selected in any suitable and desired manner. In an embodiment, when a request to perform ray tracing for a ray is received by the ray tracing circuit, the corresponding ray is added to the ray data store so that the data for that ray is then available to the ray testing circuit for testing that ray against nodes of a ray tracing acceleration data structure.

In the technology described herein, the rays for testing against nodes of a ray tracing acceleration data structure stored in the ray testing circuit local node storage are selected from a pool of one or more rays to be tested against a node of a ray tracing acceleration data structure.

The pool of rays to be tested in an embodiment stores a record of rays to be tested by the ray testing circuit of the ray tracing circuit. For each ray in the pool, in an embodiment the identity of the node that the ray is to be tested against is stored (in an embodiment in the form of the (identity of the) relevant entry (line) in the ray tracing circuit node cache where the node (the data for the node) is stored).

In an embodiment, the pool of rays to be tested is in the form of a ray "parking" buffer, which stores a record of rays waiting to be tested by the ray testing circuit of the ray tracing circuit.

In an embodiment, the pool of rays to be tested (the ray parking buffer) has a plurality of entries, in an embodiment one entry for each ray that the pool can store (list), and for each entry (for each ray) stores an indication of the node that the ray is to be tested against, and an associated validity indicator (that is used to indicate whether the ray in question is actually waiting to be tested against the indicated node or not).

In an embodiment, the pool of rays to be tested has an entry for each ray that can be (and is) stored in the ray data store of the ray tracing circuit, such that for each ray that is stored in the ray tracing circuit ray store, a corresponding entry for that ray indicating the node that ray is to be tested against next can be made (when appropriate) in the ray pool.

In an embodiment, the entries in the pool of rays waiting to be tested are configured and divided per sub-set of entries (per bank) of the ray data store of the ray tracing circuit (where the ray data store of the ray tracing circuit is configured such that plural different rays can be read from it in parallel), such that rays in the pool from (and for) a given sub-set of entries (bank) in the ray data store can (easily) be identified.

A ray should be, and is in an embodiment, added to the pool of rays for testing (its entry in the pool of rays set accordingly) when the ray is to be tested against a node of a ray tracing acceleration data structure as part of the traversal of the ray through a ray tracing acceleration data structure that the ray tracing circuit is performing.

In an embodiment, the traversals for rays that are being traced by the ray tracing circuit are tracked by the ray tracing circuit and each time a ray needs to be tested against a node as part of its traversal, that ray (that ray node combination) is added to the pool of rays to be tested, for that ray (that ray node combination) then to be tested by the ray testing circuit.

Once a ray in the pool has been tested, it is in an embodiment removed from the pool of rays indicated as waiting to be tested and the traversal of the ray is then continued. If the ray then needs to be tested against a further node as part of its traversal, the ray will again be added to the ray pool for testing against that (new) node, and so on. This will be performed for each ray that the ray tracing unit has been requested to trace.

In an embodiment, when it is determined that a ray needs to be tested against a new node as part of its ray tracing acceleration data structure traversal, the ray is (in an embodiment) added to the ray pool to indicate that it is awaiting that test (as discussed above), together with there being a corresponding lookup into the ray tracing circuit node cache to determine whether the data for the node that the ray is to be tested against is already present in the ray tracing circuit node cache or to trigger the loading of the node data into the load cache of the ray tracing circuit, if required.

In an embodiment, the ray tracing circuit includes a control circuit (a ray processing unit) that is configurable and operable to control the overall traversal process for rays that are to be traced by the ray tracing circuit. This traversal control circuit correspondingly in an embodiment receives rays to be processed, and then controls the traversal of those rays through the appropriate ray tracing acceleration data structure(s) (until an appropriate stop condition for the ray in question is reached). As part of this process, the traversal controller in an embodiment issues appropriate ray-node test combinations to the ray pool and the ray tracing circuit node cache (as discussed above), to trigger the required ray node tests (and ensure that the required ray and node data for those tests is available to the ray testing circuit).

To facilitate this, and as discussed above, an appropriate traversal record is in an embodiment maintained for each ray, which traversal record is in an embodiment indicative of a node or nodes that a ray is to be tested against. The traversal record for a ray can correspondingly be, and is in an embodiment, used to determine and select the node that a ray is to be tested against next.

In an embodiment, plural rays can be added to the pool of rays in a given processing cycle (simultaneously). In an embodiment the number of rays that can be added to the pool of rays in a given processing cycle corresponds to the number of rays that can be tested in parallel by the ray testing circuit in a given processing cycle.

Thus in an embodiment four rays can be added to the ray pool in a given processing cycle.

As well as the node data, the ray testing circuit of the ray tracing circuit will need to be provided with the appropriate ray data for performing the ray node tests. This is again in an embodiment achieved by the ray testing circuit having appropriate local storage for data of (rays) it is testing, in an embodiment in the form of an appropriate set of one or more, and in an embodiment plural, (staging) registers for storing the ray data for use by the ray testing units of the ray testing circuit.

The ray data is in an embodiment loaded into the local ray storage of the ray testing circuit from the ray data storage of the ray tracing circuit.

In an embodiment, the ray testing circuit local ray storage can store plural rays in parallel. In an embodiment, one ray from each sub-set of the entries (from each bank) of the ray data store of the ray tracing circuit can be loaded into the ray testing circuit local ray storage in a given processing cycle (in parallel). In an embodiment, the ray testing circuit correspondingly stores and can test data for four rays in parallel.

The ray scheduling circuit selects the rays to be tested by the ray testing circuit from the pool of rays. Correspondingly, it will, in effect, and in an embodiment, select the rays whose data is to be loaded into the ray testing circuit local ray storage from the ray storage of the ray tracing circuit for testing.

In an embodiment, one ray is selected for testing from each sub-set of entries (from each bank) of the ray storage of the ray tracing circuit (in a given a processing cycle) (where possible).

In order to select the rays to be processed, the ray scheduling process/circuit is provided with (in an embodiment from the node scheduling circuit) an indication of the ray tracing acceleration data structure nodes that are currently present in the ray testing circuit local node storage.

The ray scheduling process/circuit in an embodiment also receives an indication of the rays that are currently present in the ray pool and awaiting testing. The ray scheduling process/circuit in an embodiment identifies those rays that are to be tested against a node that is present in the ray testing circuit local node storage, and then selects a ray or rays from the ray pool for processing next accordingly.

The ray scheduling can use the indication of the nodes that are stored in the local node storage of the ray testing circuit to select rays for testing in any suitable and desired manner. In an embodiment the process is so as to preferentially (and in an embodiment only) select rays for testing for which a node is indicated as being stored in the local node storage of the ray testing circuit. In an embodiment, the ray scheduling is configured to only select a ray for testing if the node it is to be tested against is present in the ray testing circuit local node storage.

In an embodiment, for a, in an embodiment for plural, and in an embodiment for each, node that is indicated as being stored in the local node storage of the ray testing circuit, one or more, and in an embodiment plural, and in an embodiment all, of the rays in the pool that are due to be tested against that node are identified, with a next ray or rays to test then being selected from the so-identified rays.

In an embodiment, the ray selection is performed as a two stage process, in which appropriate rays that will use each node in the local node storage of the ray testing circuit are first identified, and then a second selection takes place to pick the rays to actually issue for processing from the respective list or lists of "candidate" rays. The second selection is in an embodiment performed in a round robin manner.

In an embodiment, the selection of the rays to issue for testing, e.g., and in an embodiment, from a set of "candidate" rays that will be tested against respective nodes in the local node storage of the ray testing unit, is subject to one or more further conditions or criteria for the selection of rays to be tested next.

For example, the ray selection in an embodiment also takes account of the number of a particular type of node that can be tested in parallel by the ray testing circuit (e.g., and in an embodiment, based on the number and type of ray-node tests that the ray testing circuit can perform in parallel). For example, where the ray testing circuit only has a single triangle node test unit and a single transform node test unit, the ray scheduling (in an embodiment) operates to select for processing at most only one ray to be tested against a triangle node in any given processing cycle, and correspondingly, only one ray to be tested against a transform node in any given processing cycle.

The scheduling (and selection) of rays to be tested is in an embodiment configured to prioritise testing of rays against a particular type or types of node over nodes of a different type. n an embodiment testing against a triangle node is set as the highest priority, followed by testing against a transform node as the second highest priority, and then testing against a box node as the lowest priority.

Thus the ray scheduling will in an embodiment, and so far as possible, try to ensure that a ray to be tested against a (the) triangle node in the ray testing circuit local node storage is selected for testing in any given processing cycle, and then once a ray for testing against that triangle node has been selected (if possible), then select a ray for testing against a (the) transform node in the ray testing circuit local node storage (if possible), and then thereafter select rays for testing against box nodes stored in the ray testing circuit local node storage.

When selecting a ray for testing the ray scheduling circuit in an embodiment also avoids selecting (does not select) a ray from a sub-set (a bank) of the ray storage from which a ray has already been selected in the processing cycle in question.

The ray scheduling is in an embodiment operable to and configured to select one ray for testing from each respective sub-set of ray entries (from each bank) of the ray storage of the ray tracing circuit in a given processing cycle, wherever possible.

To select the rays to be tested, the ray scheduling in an embodiment uses, in an embodiment for each respective sub-set of rays of (bank of) the ray store of the ray tracing circuit, a list of rays that are waiting in the ray pool to be tested (for the sub-set in question).

The ray scheduling in an embodiment then uses the lists of rays to be tested (for a given ray storage sub-set (bank)), to identify rays in the pool (from the ray storage sub-set (bank) in question) that can currently be tested against a, and in an embodiment each, node in the ray testing circuit local node storage.

The ray scheduling in an embodiment then selects, in an embodiment in a round robin fashion, a next ray (if any) to be tested from a (and in an embodiment from each) ray store sub-set (bank) for each of the nodes (entries) in the ray testing circuit local node storage.

The ray scheduling in an embodiment then performs a further selection from these "candidate" rays for testing to select the actual ray or rays that will be tested next.

In an embodiment, once a ray has been sent for testing, the ray is correspondingly removed from the ray pool (e.g. by setting the entry for the ray in the ray pool to indicate that the ray is not still waiting to undergo the node test in question).

In an embodiment, when the last ray in the ray pool for testing against a node currently stored in the ray testing circuit local node storage has been selected and sent for testing, that is indicated to the node scheduling circuit, so that the node scheduling circuit can then identify that the node has been finished with and so can be replaced in the ray testing circuit local node storage with a new node.

Correspondingly, in an embodiment, when the last ray in the ray pool for testing against a node currently stored in the ray testing circuit local node storage has been selected and sent for testing, that is indicated to the ray tracing circuit node cache (tag table), so that the ray tracing circuit node cache (tag table) can be updated to indicate that the data for the node in question can be evicted from the ray tracing circuit node cache.

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process.

In this case, the operation in the manner of the technology described herein may be, and is in an embodiment, used when and for analysing the intersections of the secondary rays.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics (data) processing system may, for example, include one or more of: a host processor (central processing unit (CPU)), the graphics processor (processing unit), a display processor, a video processor (codec), a system bus, and a memory controller.

The graphics processor and/or graphics (data) processing system may also comprise, and/or be in communication with, one or more memories and/or memory devices that store the data described herein, and/or the output data generated by the graphics processor, and/or that store software (e.g. (shader) programs) for performing the processes described herein. The graphics processor and/or graphics (data) processing system may also be in communication with a display for displaying images based on the data generated by the graphics processor.

It will be appreciated by those skilled in the art that all of the described embodiments of the technology described herein can, and in an embodiment do, include, as appropriate, any one or more or all of the features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory, computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
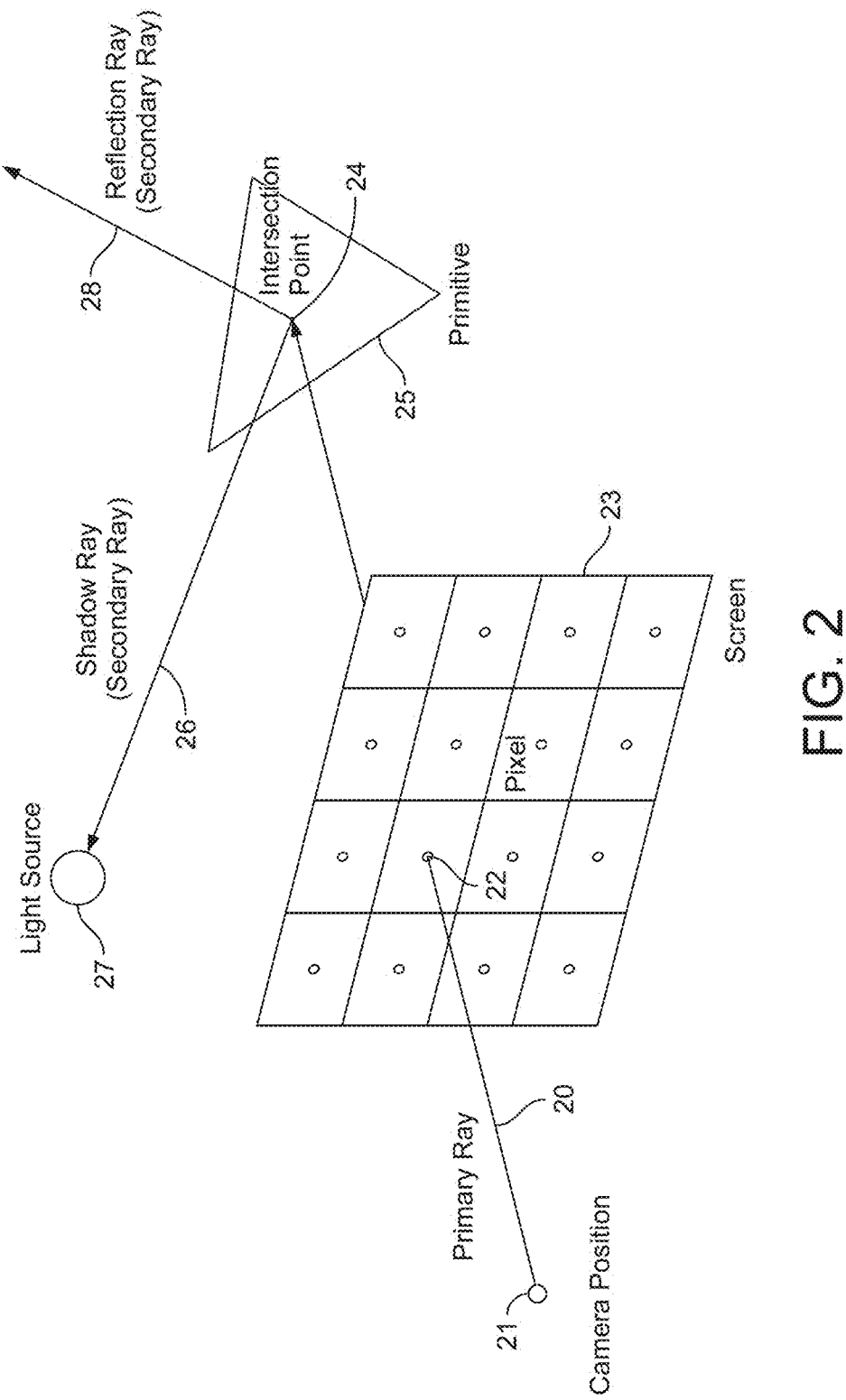
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered). In the present embodiments, ray tracing acceleration data structures in the form of Bounding Volume Hierarchy (BVH) trees are used.

Figure 3:
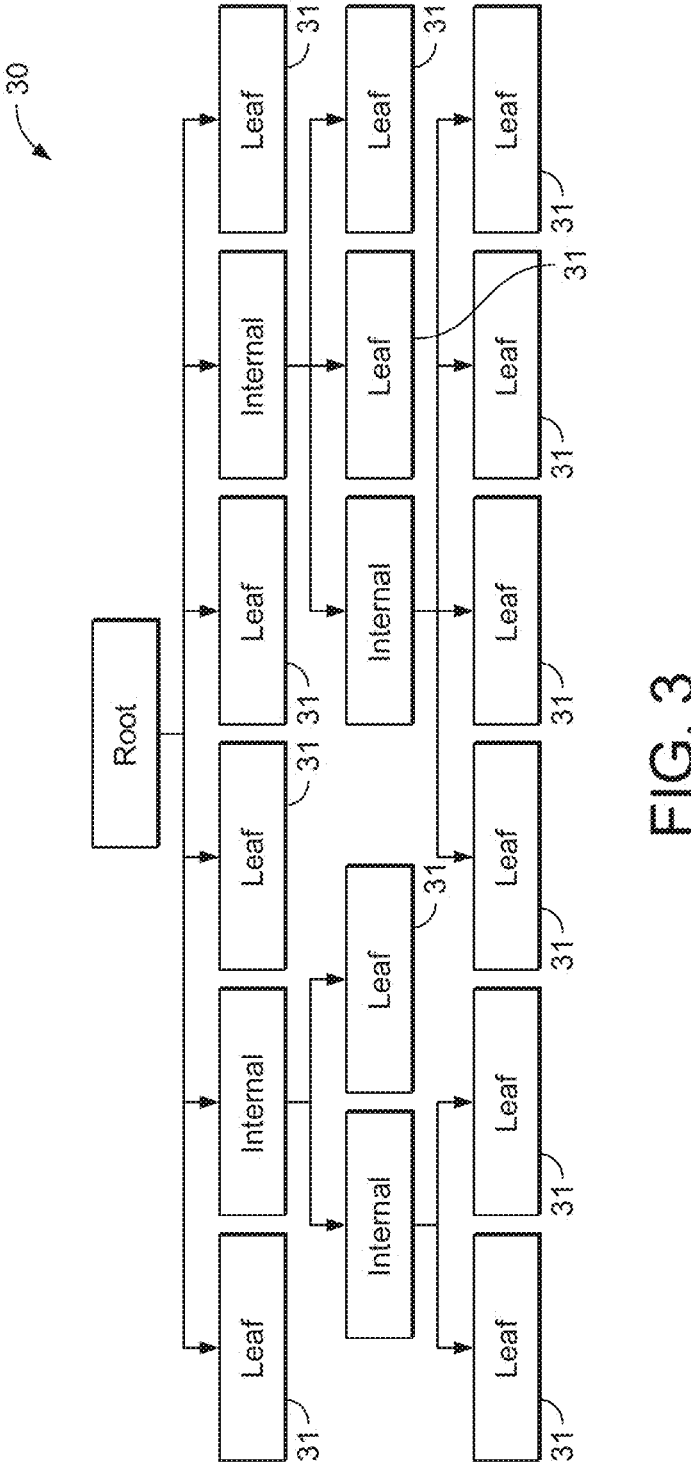
FIG. 3 shows an exemplary ray tracing acceleration data structure.

FIG. 3 shows an exemplary BVH tree 30, constructed by enclosing a volume in an axis-aligned bounding volume (AABV), e.g. a cube, and then recursively subdividing the bounding volume into successive sub-AABVs according to any suitable and desired subdivision scheme, until a desired smallest subdivision (volume) is reached.

In this example, the BVH tree 30 is a relatively "wide" tree wherein each bounding volume is subdivided into up to six sub-AABVs. However, in general, any other suitable tree structure may be used, and a given node of the tree may have any suitable and desired number of child nodes.

Thus, each node in the BVH tree 30 will have a respective volume associated with it, with the end, leaf nodes 31 each representing a particular smallest subdivided volume, and any parent node representing, and being associated with, the volume of its child nodes.

A complete scene may be represented by a single BVH tree, e.g. with the tree storing the geometry for the scene in world space. In this case, each leaf node of the BVH tree 30 may be associated with the geometry defined for the scene that falls, at least in part, within the volume that the leaf node corresponds to (e.g. whose centroid falls within the volume in question). The leaf nodes 31 may represent unique (non-overlapping) subsets of primitives defined for the scene falling within the corresponding volumes for the leaf nodes 31.

Figure 4:
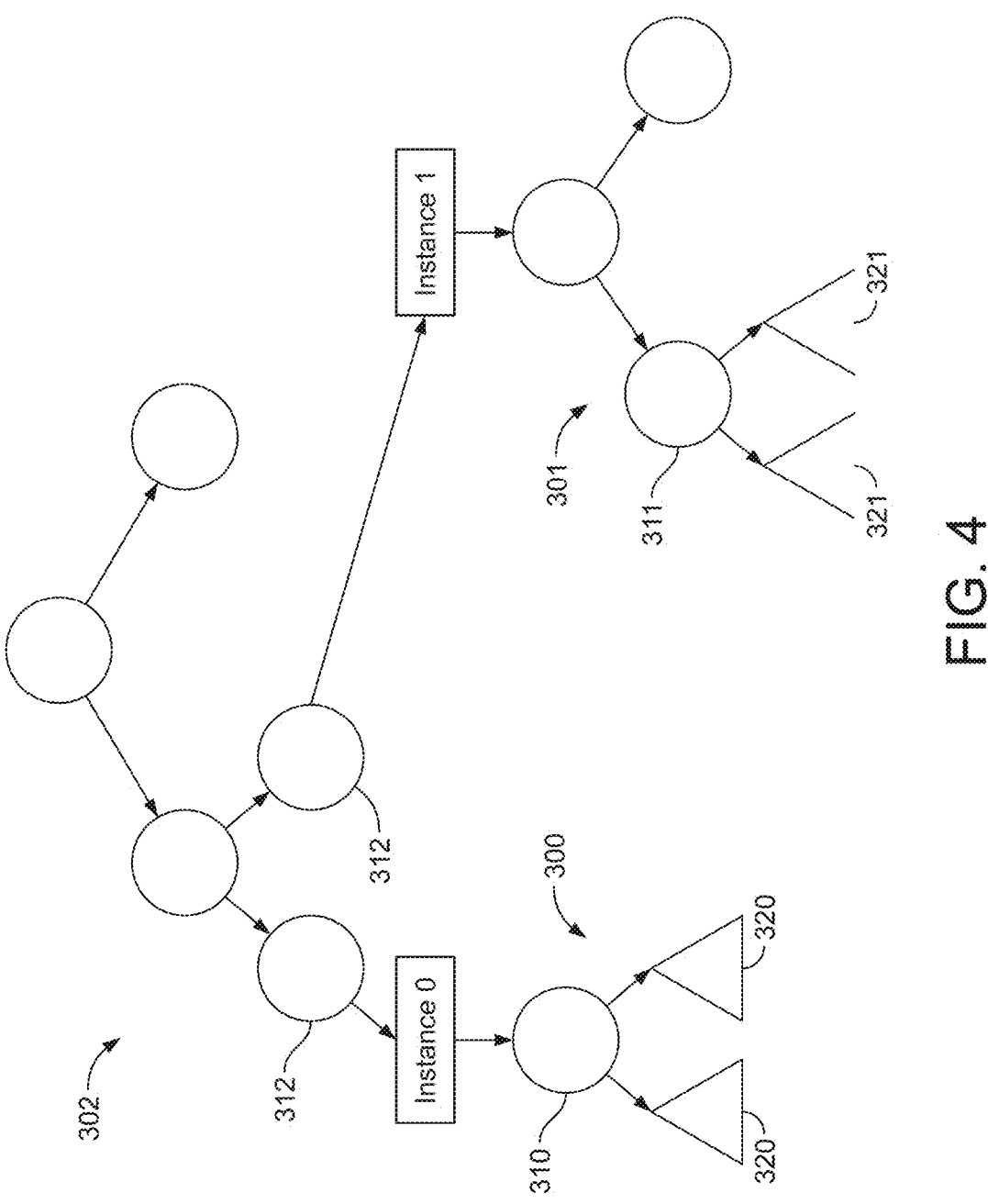
FIG. 4 shows in more detail an exemplary multi-level arrangement of ray tracing acceleration data structures that may be used according to embodiments of the technology described herein.

In the present embodiments, a two-level arrangement of ray tracing acceleration data structures is used to represent the distribution of geometry within the scene to be rendered. FIG. 4 shows an exemplary two-level arrangement of ray tracing acceleration data structures in which each instance or object within the scene is associated with a respective bottom-level acceleration structure (BLAS) 300, 301, which in the present embodiments is in the form of a respective BVH tree that stores geometry in model space, with each leaf node 310, 311 of the BVH tree representing a unique subset of primitives 320, 321 defined for the instance or object falling within the corresponding volume.

A separate top-level acceleration structure (TLAS) 302 then contains references to the set of bottom-level acceleration structures (BLAS), together with a respective set of shading and transformation information for each bottom-level acceleration structure (BLAS). In the present embodiments, the top-level acceleration structure (TLAS) 302 is defined in world space and is in the form of a BVH tree having leaf nodes 312 that each point to one or more of the bottom-level acceleration structures (BLAS) 300, 301.

The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Other forms of ray tracing acceleration data structure would be possible.

Figure 5:
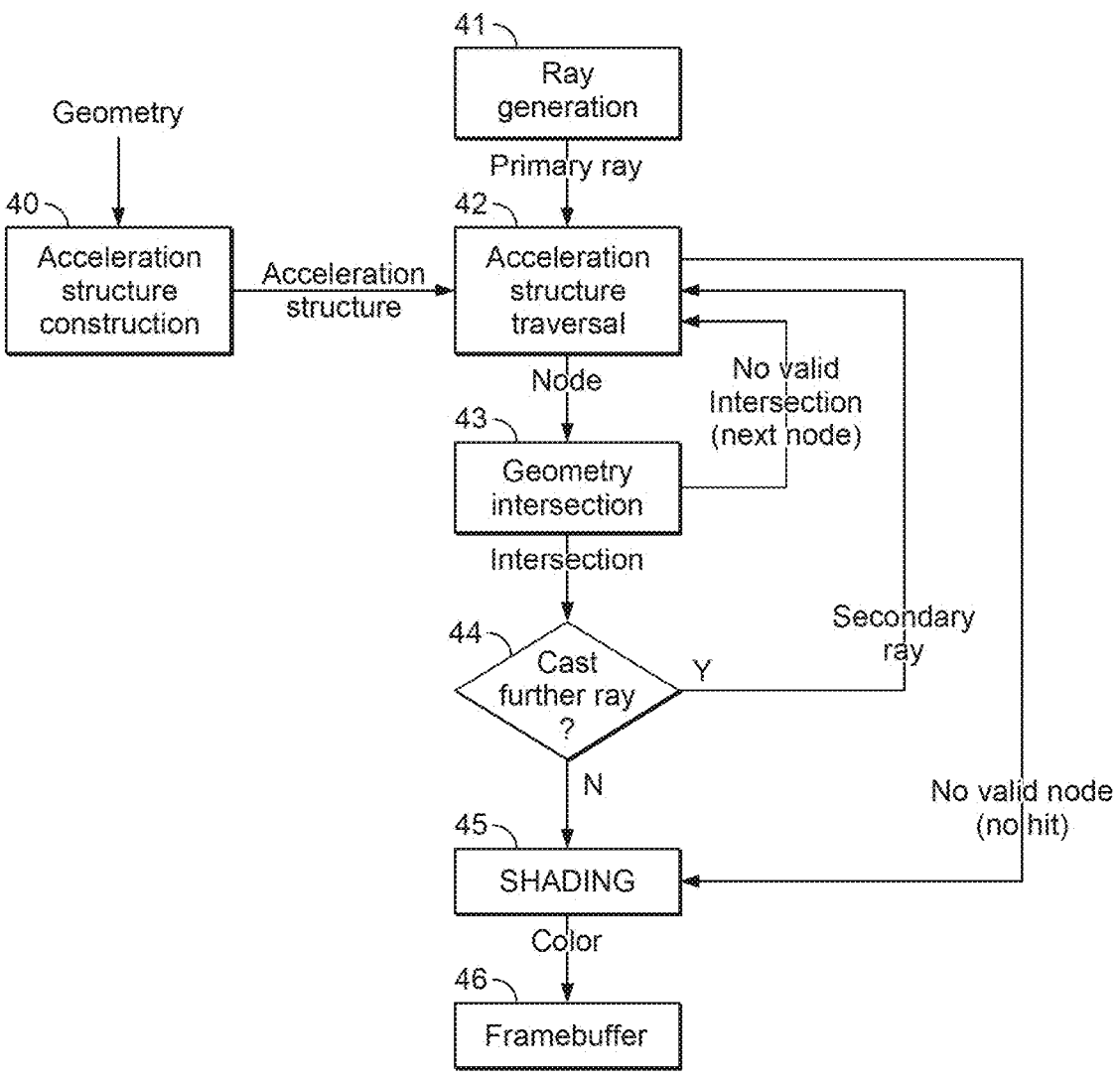
FIG. 5 is a flow chart illustrating an embodiment of a full ray tracing process.

FIG. 5 is a flow chart showing the overall ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 5, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc., The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 6:
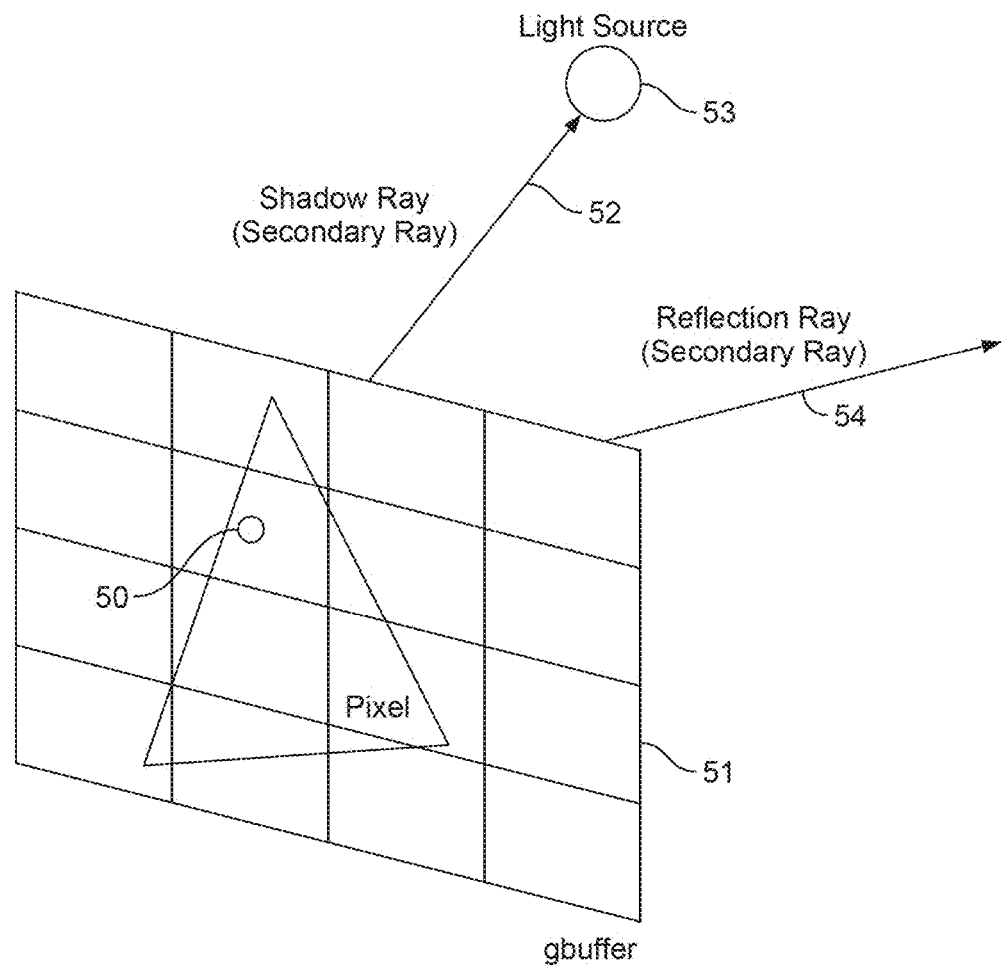
FIG. 6 is a schematic diagram illustrating a "hybrid" ray tracing process.

FIG. 6 shows an alternative ray tracing process which may be used in embodiments of the technology described herein, in which only some of the steps of the full ray tracing process described in relation to FIG. 5 are performed. Such an alternative ray tracing process may be referred to as a "hybrid" ray tracing process.

In this process, as shown in FIG. 6, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 5, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 5. Thus, steps 42, 43 and 44 will be performed in the same manner as previously described in relation to the full ray tracing process for any secondary rays.

The colour determined for a sampling position will be written to the frame buffer in the same manner as step 46 of FIG. 5, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above, and in particular to the ray tracing acceleration data structure traversal and geometry intersection (steps 42-43 in FIG. 5) performed as part of the ray tracing operation.

Figure 7:
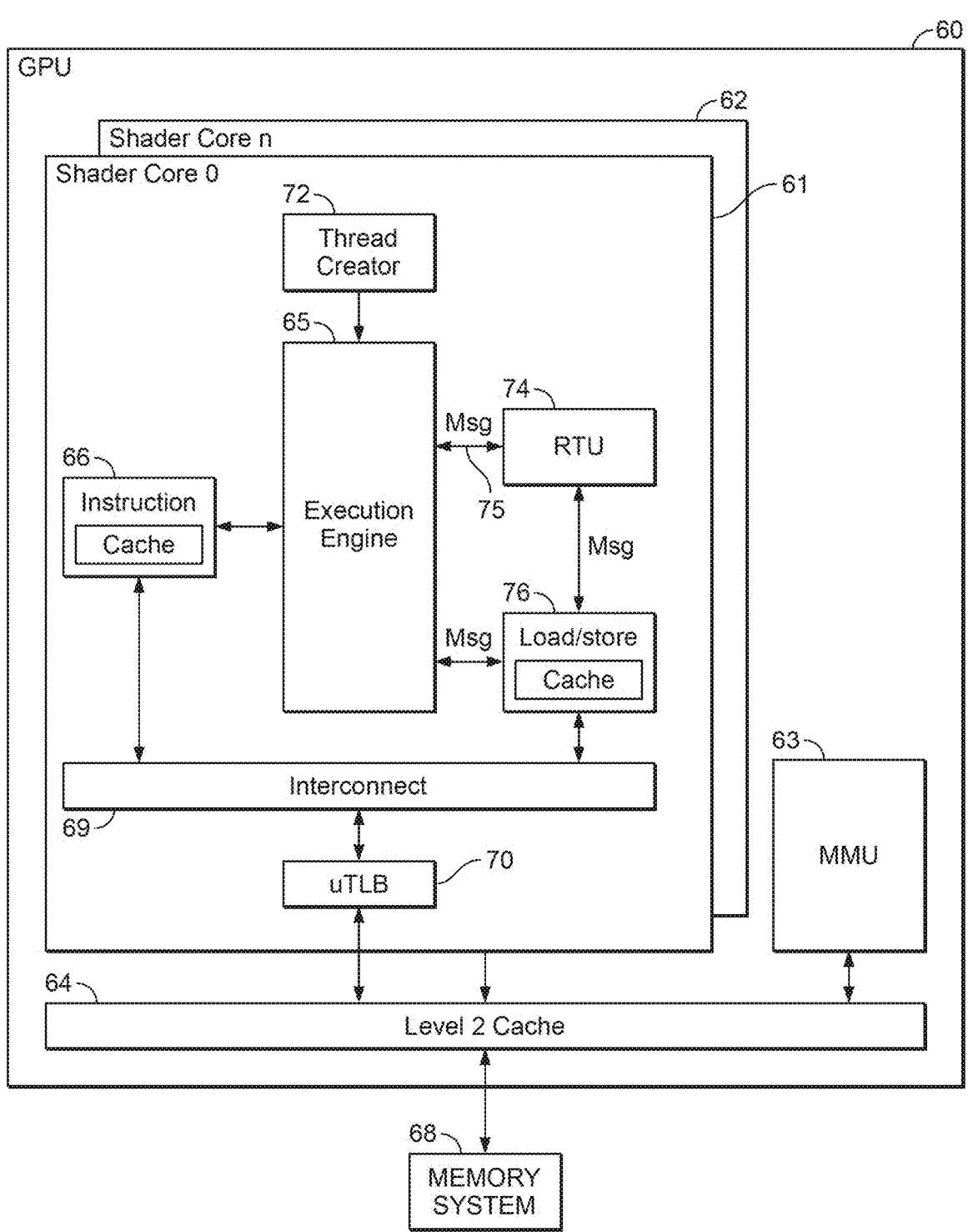
FIG. 7 shows schematically an embodiment of a graphics processor that can be operated in the manner of the technology described herein.

FIG. 7 shows schematically the relevant elements and components of a graphics processor (GPU) 60 of the present embodiments.

As shown in FIG. 7, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 7 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, a ray, etc., The shader cores will process each "item" by means of one or more execution threads which will execute the instructions of the shader program(s) in question for the "item" in question. Typically, there will be multiple execution threads each executing at the same time (in parallel).)

FIG. 7 shows the main elements of the graphics processor 60 that are relevant to the operation of the present embodiments. As will be appreciated by those skilled in the art there may be other elements of the graphics processor 60 that are not illustrated in FIG. 7. It should also be noted here that FIG. 7 is only schematic, and that, for example, in practice the shown functional units may share significant hardware circuits, even though they are shown schematically as separate units in FIG. 7. It will also be appreciated that each of the elements and units, etc., of the graphics processor as shown in FIG. 7 may, unless otherwise indicated, be implemented as desired and will accordingly comprise, e.g., appropriate circuits (processing logic), etc., for performing the necessary operation and functions.

As shown in FIG. 7, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 7, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 7, the shader core 61 further comprises a thread creator (generator) 72 operable to generate execution threads for execution by the programmable execution unit 65.

As shown in FIG. 6, the shader core 61 also includes a ray tracing circuit (unit) ("RTU") 74, which is in communication with the programmable execution unit 65, and which is operable to perform the required geometry intersection determinations for rays being processed as part of a ray tracing-based rendering process (i.e. the operations of steps 42 and 43 of FIG. 4 of traversing the acceleration data structure to determine with reference to the node volumes of the acceleration data structure geometry that is potentially intersected by the ray and the corresponding ray-primitive testing to determine which geometry, if any, is actually intersected by the ray), in response to messages 75 received from the programmable execution unit 65.

The RTU 74 is also able to communicate with the load/store unit 76 for loading in the required data for such intersection testing, such as the node data defining the nodes to be tested (e.g. which node data may include data identifying a set of primitives, but could also identify a BLAS to be traversed, as well as any transform that is to be applied, for example).

In the present embodiments, the RTU 74 of the graphics processor is a (substantially) fixed-function hardware unit (circuit) that is configured to perform the required operations to determine geometry for a scene to be rendered that may be (and is) intersected by a ray being used for a ray tracing operation. However, some amount of configurability may be provided.

Figure 8:
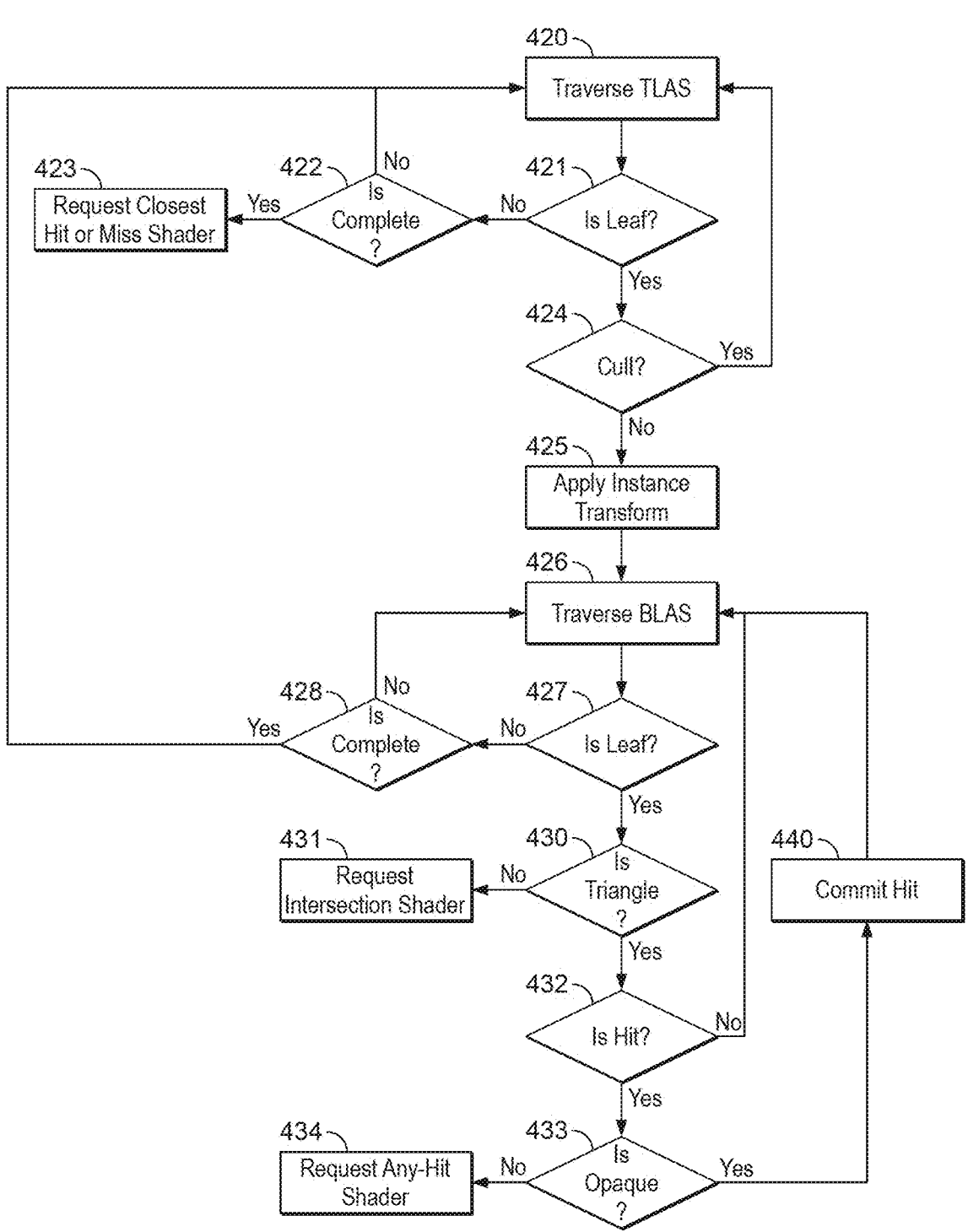
FIG. 8 is a flow chart illustrating the ray tracing operations that can be performed by a ray tracing unit ("RTU") of a graphics processor an embodiment of the technology described herein in response to the graphics processor programmable execution unit messaging the RTU to determine the geometry, if any, that is intersected by a particular ray.

FIG. 8 is a flow chart showing the operation of the RTU 74 according to the present embodiments in response to receiving a message from the programmable execution unit 65 to determine, for a group of rays for which a program to perform ray tracing is being executed by a respective thread group (warp) within the programmable execution unit, the geometry, if any, that is intersected by the rays in question.

FIG. 8 in particular shows in more detail the traversal operations that are performed by the RTU for a two-level arrangement of acceleration structures, e.g. as described above with reference to FIG. 4. As shown in FIG. 8, in this case, acceleration structure traversal begins with TLAS traversal (step 420), and TLAS traversal continues in search of a TLAS leaf node (steps 421, 422).

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate ("object") space for BLAS traversal (step 425). BLAS traversal then begins (step 426), and continues in search of a BLAS leaf node (steps 427, 428). If no BLAS leaf node can be identified, the process may return to TLAS traversal (step 420) until all of the nodes have been tested, as necessary, and the traversal operation is completed.

In the present embodiments, geometry associated with a BLAS leaf node can be in the form of a set of triangle primitives or an axis aligned bounding box (AABB) primitive. When (at step 427) a BLAS leaf node is identified, it is determined whether geometry associated with the leaf node is in the form of a set of triangle primitives or an axis aligned bounding box (AABB) primitive (step 430). As shown in FIG. 8, when an axis aligned bounding box (AABB) primitive is encountered, execution of a shader program ("intersection" shader) that defines a procedural object encompassed by the axis aligned bounding box (AABB) is triggered (step 431) to determine whether a ray intersects the procedural object defined by the shader program.

On the other hand, when a set of triangle primitives is encountered, determining whether a ray intersects any of the triangle primitives is performed by the RTU (step 432), as shown in FIG. 8. Thus, if no (valid) triangle primitives which the ray intersects can be identified in the node, the process returns to BLAS traversal (step 426). If a ray is found to intersect a triangle primitive, it is determined whether or not the triangle primitive is opaque (step 433). In the case of the triangle primitive being found to be non-opaque, execution of an appropriate shader program ("any-hit" shader) may be triggered (step 434). Otherwise, in the case of the triangle primitive being found to be opaque, the intersection can be committed without executing a shader program (step 440), and the BLAS traversal continued accordingly (step 426).

The traversal thus proceeds in this way, determining which nodes, if any, are intersected by the ray for which the traversal is being performed.

If no TLAS leaf node can be identified that is intersected by the ray, it is determined that there is an intersection miss, and in that case, a "default" shading operation ("miss" shader) may be performed (step 423), e.g. as described above. If the ray does intersect some geometry, so long as the geometry is an opaque triangle (i.e. step 433—yes), the geometry can be automatically committed, e.g., and in embodiments, added to a record of the intersected geometry. Once the traversal is completed (step 422), the appropriate "closest-hit" shader can then be invoked accordingly (step 423) for further processing of the ray. For instance, depending on the geometry that is intersected, rendering (shading) of the sampling position and/or traversal for one or more secondary rays may be triggered, as appropriate, e.g. as discussed above.

On the other hand, as shown in FIG. 8, if the ray is determined to intersect more complex (non-triangle) primitives such as an axis aligned bounding box (AABB) primitive (at step 430), the RTU in the present embodiments is not able to automatically commit that hit, and the traversal is instead stopped at this point such that the ray can be returned to the programmable execution unit to execute the required "intersection" shader (as determined by the RTU at step 431).

Likewise, if the ray is determined to intersect a non-opaque triangle (step 433—no), the RTU in the present embodiments again cannot automatically commit that hit, as it is required to first execute an appropriate "any-hit" shader (as determined by the RTU at step 434) in order to determine whether or not the hit should be committed. Thus, again, in this situation, the traversal is stopped at this point such that the ray can be returned to the programmable execution unit to execute the required "any-hit" shader.

In both these cases, the traversal is therefore stopped in order to return the processing of the ray to the programmable execution unit to execute the required shader program routine. Once the required shader has been executed, however, the ray should then be (and is) returned to the RTU in order to complete it's traversal.

In the present embodiments, in that case, when the processing of a ray is returned by the RTU to the programmable execution unit before the RTU has completed its processing of the ray, such that the ray should then be (and is) subsequently returned to the RTU to complete its traversal, the traversal is started again, from the beginning (i.e. from the root node of the TLAS). This then saves having to write out the current state of the traversal operation (e.g. the traversal stack) in its entirety which can take up significant memory resource (although this could of course be done in other possible implementations).

In the present embodiments, the ray tracing operation is thus initially performed by the programmable execution unit 65 executing a program to perform ray tracing. In this respect, the programmable execution unit 65 typically executes the program for a plurality of rays at the same time, e.g. in lockstep, with the individual rays being processed by respective execution threads in an execution thread group. The program to perform ray tracing includes 'ray tracing' instructions that trigger the RTU 74 operation. Thus, programmable execution unit 65 when executing a program to perform ray tracing, in response to a group of execution threads executing such 'ray tracing' instructions, is operable to send a message to the RTU 74 to trigger the RTU's processing of the rays, e.g. in the manner described above.

The 'ray tracing' instruction, when executed, thus traces a group of rays (up to a warp's worth of rays) through one or more acceleration data structures in order to determine the geometry, if any, that is intersected by the rays in the group. Once the RTU 74 is triggered, the rays are then processed independently of one another within the RTU 74, with the respective traversals being performed and managed until one of the following conditions is met: (i) it is determined that the ray doesn't intersect anything (there is a "miss"); (ii) the intersected primitive closest to the ray origin is found (the 'closest-hit' geometry); (iii) a no-opaque triangle is found (in which case an "any-hit" shader is required to be executed); or (iv) an AABB primitive is intersected (in which case an "intersection" shader is required to be executed). Depending on the result, the RTU 74 should then, and does, return the ray to the programmable execution unit 65 to execute the required shader program routine for further processing the ray.

Thus, it will be appreciated that the operation of the RTU 74 in the present embodiments is typically triggered for groups of one or more rays together (e.g. for which a corresponding execution thread group (warp) was executing the program to perform ray tracing). The RTU 74 then performs and manages the traversal for the different rays individually. However, the RTU 74 is also configured to, and operable to, return groups of rays to the programmable execution unit 65 for execution by a respective execution thread group (warp).

In this respect, the RTU 74 could attempt to preserve the original group of rays. However, there is no need to do this, and the RTU 74 in the present embodiments is also configured to, and operable to, return arbitrary groups of rays. The RTU 74 can therefore attempt to group rays based on one or more heuristics in order to provide a more optimised continued processing of the rays.

It will be appreciated from the above that the RTU 74 and programmable execution unit 65 are thus configured to, and operable to, message each other in order to control the overall ray tracing operation, with the messages that are passed between the RTU 74 and programmable execution unit 65 passing the required information for controlling the processing between the two units.

In the present embodiments, the control of the ray tracing operation is therefore performed by the programmable execution unit 65 and the RTU 74 exchanging messages with each other, with the messages triggering the respective operations to be performed (as described above) and also passing the required information between the two units.

The messaging protocol and control described above is in embodiments controlled by the introduction of 'ray tracing' instructions that when executed by the programmable execution unit 65 cause the programmable execution unit 65 to send a message to the RTU 74 to perform geometry determination.

The execution of a 'ray tracing' instruction by the programmable execution unit 65 thus triggers the programmable execution unit 65 to send a message to the RTU 74 to trigger the RTU 74 to perform a traversal.

In the present embodiments, the 'ray tracing' instruction when executed by the programmable execution unit 65 passes a pointer to a certain 'ray data' data structure to the RTU 74, together with an indication of whether the ray is a new ray or a ray that is to be resumed. If the ray tracing program wishes to start tracing a new ray, then the parameters to create that ray in the RTU 74 are also passed to the RTU 74 at this point. On the other hand, if the ray tracing program wishes to resume tracing an existing ray, then the RTU 74 can read that ray from memory.

The 'ray data' data structure generally stores information relating to the traversal that may need to be passed between the programmable execution unit 65 and the RTU 74 when performing the operations described above, such as one or more of, and in an embodiment all of: information relating to the parameters defining the ray that is to be processed in the world space co-ordinate system; information relating to any committed hits for the ray; information relating to the parameters defining the ray to be processed in an object space co-ordinate system; and information relating to any candidate hits for the ray.

The RTU 74 will then trace the ray until the ray needs to be returned to the programmable execution unit 65 for further processing. (As discussed above, this might be because the traversal has completed and the closest-hit primitive has been found, or it has been determined that there is an intersection miss, but could also be because the traversal has stopped in response to the RTU 74 determining that the ray has hit a non-opaque or AABB primitive that needs further processing before the traversal can continue.)

At that point, the RTU 74 writes to the 'ray data' data structure and passes information about the reason that the ray is being returned and the (index of the) shader program routine that should be executed for further processing of the ray back to the programmable execution unit 65.

Thus, once the RTU 74 has performed the necessary traversal or traversals for a ray, and, e.g., determined geometry that is intersected by the ray, that information is returned to the programmable execution unit 65, for the programmable execution unit to perform further processing for the sampling position in question as a result of, and based on, the result of the determined traversal for the ray, with the further processing being controlled based on the RTU 74 determining and selecting an appropriate shader program routine that should be executed for further processing the ray in question.

The programmable execution unit 65 then executes the selected further shader program for the generated thread (e.g. step 45 in FIG. 5).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Various other arrangements would be possible.

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor).

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, appropriate 'ray tracing' instructions to cause the programmable execution unit to send a message to the RTU 74 to perform the desired geometry determinations.

The compilation process (the compiler) can use any suitable and desired compiler techniques for this.

The technology described herein and the present embodiments relate in particular to the operation of the ray tracing unit 74 shown in FIG. 7 when performing ray tracing. The operation of the ray tracing unit will now be described in more detail with reference to FIGS. 9 to 12.

Figure 9:
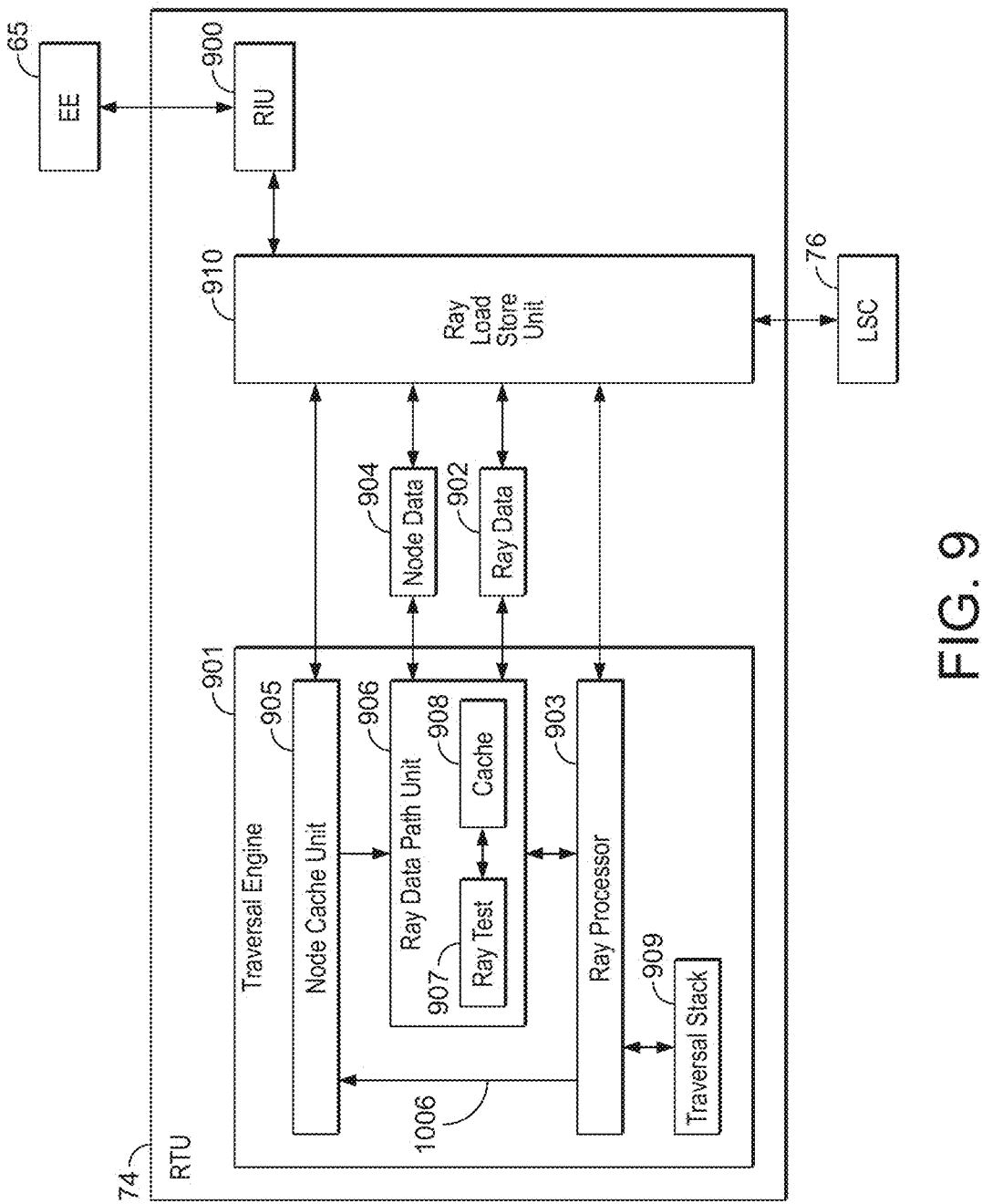
FIG. 9 shows an embodiment of a ray tracing unit of a graphics processor that can be operated in the manner of the technology described herein.

FIG. 9 shows the ray tracing unit (circuit) (RTU) 74 in more detail. The ray tracing unit 74 in particular performs the ray tracing acceleration data structure traversals for rays that are to be traced, and includes, as shown in FIG. 9, a traversal engine (unit) 901 for doing that.

As will be discussed further below, the traversal engine 901 includes in particular a ray testing circuit (in the form of a ray data path unit) 906 that performs the ray-node (intersection) tests necessary for the traversal operations. To do this, the ray testing circuit (ray data path unit) 906 includes a plurality of ray testing units (circuits) 907, each operable to perform a particular type of ray-node test.

In the present embodiments, and as will be discussed in more detail below, the ray testing circuit (ray data path unit) 906 includes as its ray testing units 907, four ray testing units configured to perform tests for non-end (non-leaf) nodes ("box" nodes) of a ray tracing acceleration data structure, one ray testing unit configured to perform ray-node tests for end (leaf) nodes that indicate a transition from one ray tracing acceleration data structure to another ("transform" nodes), and one ray testing unit configured to perform ray-node tests for end (leaf) nodes of a ray tracing acceleration data structure that indicate actual geometry to be tested ("triangle" nodes).

Other combinations and numbers of ray-node testing units (circuits) would, of course, be possible.

In order to perform the ray-node tests, the respective ray node testing units are provided with the appropriate ray and node data (again this operation will be discussed in more detail below). In order to facilitate this information, data of nodes and rays to be tested is stored locally in the ray tracing unit 74 in a node cache data storing part (which is in the form of an SRAM) 904, and a ray data store (which is in the form of an SRAM) 902, respectively, as shown in FIG. 9. (As will be discussed further below, the node data store 904 is the node data storing part of a node cache of the ray tracing unit 74, with the corresponding node cache tag table being part of the node cache unit 905.)

As shown in FIG. 9, the ray data path unit 906 further includes node storage (a cache) 908 local to the ray data path unit (which storage in the present embodiment is in the form of a set of (staging) registers accessible to the ray tracing units of the ray datapath unit 906), in which, as will be discussed further below, ray tracing acceleration structure node data is stored for use by the ray testing units 907 when performing ray-node tests.

As shown in FIG. 9, the traversal engine 901 in addition to the ray data path unit 906 also includes a ray processing unit (ray processor) 903 that has an associated traversal stack 909, and a node cache unit/controller 905.

The ray processing unit 903 controls the overall traversal process for rays that are to be traced by the traversal unit 901. The traversal stack 909 is used to keep track of the traversal progress of rays that are being traced through a ray tracing acceleration data structure. The node cache unit 905 operates to coordinate and schedule the actual ray-node tests on the ray data path unit 906, and to, inter alia, ensure that the appropriate ray and node data is provided to the desired ray testing unit for the required ray-node tests.

As discussed above, the tracing of rays by the ray tracing unit 74 is triggered by appropriate messages from the execution engine 65 (in response to "ray tracing" instructions in a shader program that the execution engine is executing). To facilitate this, as shown in FIG. 9, the ray tracing unit 74 includes a ray instruction unit (RIU) 900 that receives the messages from the execution engine 65 of a shader core when ray tracing is to be performed for respective rays. (The ray instruction unit 900 correspondingly returns respective rays to the execution engine 65 for further processing when required (as discussed above).)

In response to a message from the execution engine 65 to perform ray tracing for a ray or rays, the ray instruction unit 900 controls a ray load store unit (RLSU) 910 to create an appropriate set of one or more rays to be processed.

For each ray to be traced, the ray load store unit 910 allocates an (internal) ID for the ray and loads the relevant ray data to the ray data store (ray SRAM) 902. The ray load store unit 910 then signals the ray processing unit 903 to perform the required ray tracing acceleration data structure traversal for the ray.

The ray data store 902 has an entry for each (supported) (internal) ray ID and stores the relevant ray data for the ray having the allocated (internal) ID that the entry corresponds to. Each ray data store entry also has an associated validity indication, for indicating whether the entry stores currently valid ray data or not.

In the present embodiment, the ray data store has a capacity to store 128 rays (so 128 (internal) ray IDs are available for allocation for rays to be tested) and is configured as 4 banks of 32 rays each, with one ray being able to be read from each bank in a given processing cycle (such that four rays, one from each bank, can be read from the ray data store 902 in parallel). Other capacities, sub-divisions, and configurations of the ray data store 902 would, of course, be possible.

The node data store 904 acts as the data storing part of a node cache of the ray tracing unit 74, and, accordingly includes a plurality of entries (cache lines), each operable and configured to store data of a node or nodes of a ray tracing acceleration data structure. In the present embodiment, the node cache data store 904 has a capacity to store 256 entries (cache lines) and is configured as 2 banks, with each bank storing 512 bits (64 bytes) of node data for the node cache entry (cache line) in question (so each cache entry (line) in effect comprises 2 sub-lines of 64 bytes each, one in each cache bank). In the present embodiments, each triangle node and each transform node is assumed to occupy an entire cache line (so both banks of a node cache entry/ line), whereas each box node is assumed to occupy only one bank (only one sub-line) of a node cache entry.

Node data is able to be read from each bank in a given processing cycle (such that 2 sets (each comprising 64 bytes) of node data, one from each bank, can be read from the node cache data store 904 in parallel).

Other capacities, sub-divisions, and configurations of the node data store 904 would, of course, be possible.

As will be discussed further below, node data is loaded into the node data store 904 (the node cache) by the ray load store unit in response to requests to do that sent by the node cache unit 905. As shown in FIG. 9, the ray load store unit 910 accordingly has an appropriate interface with the node cache data store 904.

As shown in FIG. 9, the ray load store unit 910 has an appropriate interface to the load store cache 76 via which it can, inter alia, load ray data from the memory system into the ray data store 902, and load node data from the memory system into the node data store 904, as and when required.

The ray processing unit (circuit) 903 receives the rays to be processed from the ray load store unit 910 and causes the traversal engine 901 to traverse the rays through the appropriate ray tracing acceleration data structure(s) until an appropriate stop condition is reached (essentially either that the ray's traversal has been completed or that the ray needs to be returned to the execution engine 65 for appropriate shader execution (as discussed above)).

To facilitate this, as discussed above, the ray processing unit 903 uses a traversal stack 909 to keep track of the traversals of the rays that are currently being tested, and in particular of the next node that a given ray being processed is to be tested against.

When a ray reaches a stop condition, the ray processing unit 903 signals the ray load store unit 910 to that effect, and the ray load store unit appropriately "retires" the ray from the ray tracing unit 74. This may comprise, for example, and in an embodiment, de-allocating the ray ID, writing any necessary ray data from the ray data store 902 back to the memory system (via the load store cache 76) and notifying the ray instruction unit 900 that the ray has been retired (with the ray instruction unit 900 then signalling the execution engine 65 accordingly).

As discussed above, the ray data path unit 906 performs the appropriate ray/node tests for processing the rays and includes appropriate ray-node testing units (circuits) 907 for this purpose.

The ray data path unit 906 performs the ray-node testing under the control of the node cache unit 905. The ray processing unit 903 issues messages to the node cache unit 905 indicating a ray and ray tracing acceleration data structure node combination that is to be tested by the ray data path unit 906.

The node cache unit 905 ensures that the necessary ray and ray tracing acceleration data structure node data is available to the ray data path unit 906 and schedules the ray-node testing on to the ray data path unit accordingly. This operation will be discussed in more detail below.

Once it has tested a ray-node combination, the ray data path unit 906, as shown in FIG. 9, informs the ray processing unit 903 accordingly (e.g. for the ray processing unit to then identify and trigger the next ray-node test for the ray in question or to identify that a stop condition for the ray has been reached). The ray data path unit 906 may also, as shown in FIG. 9, write any resulting ray data from its testing to the ray data store 902, for example for returning to memory via the load store cache 76, as appropriate.

Figure 10:
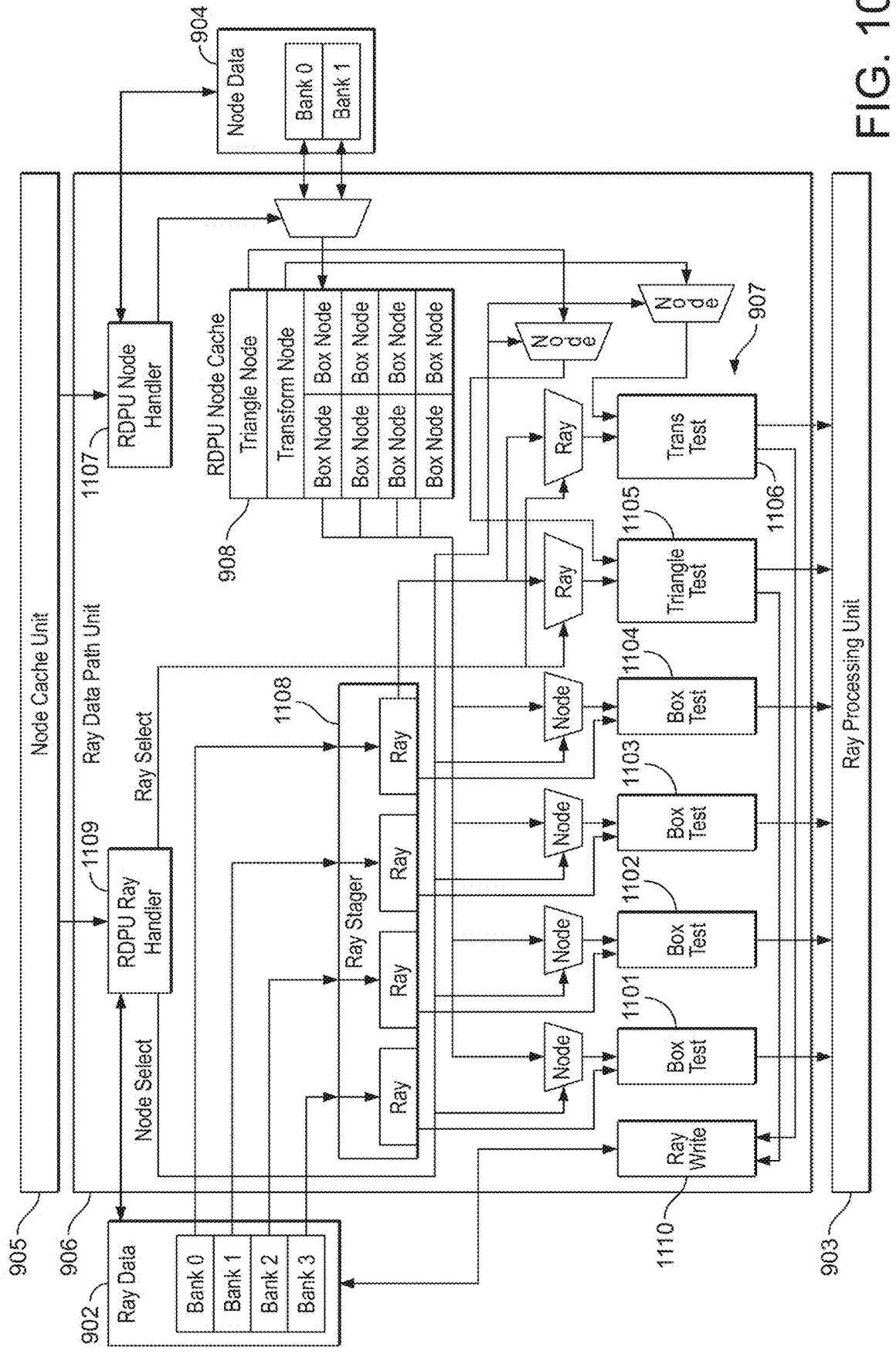
FIG. 10 shows the ray testing circuit of the ray tracing unit shown in FIG. 9 in more detail.

FIG. 10 shows the ray data path unit 906 of the traversal engine 901 of the ray tracing unit 74 in more detail.

As discussed above, the ray data path unit 906 includes a plurality of ray-node test units 907, including in the present embodiments, four "box" node test units (circuits) 1101, 1102, 1103 and 1104, a single triangle node test unit (circuit) 1105 and a single transform node test unit (circuit) 1106. In the present embodiments, the triangle node test unit 1105 is configured to be able to test three graphics primitives (in the form of triangles) against a ray in parallel. Other arrangements for the triangle test unit, would, of course, be possible.

As discussed above, in order to be able to perform the required ray-node tests, each ray-node test circuit (unit) needs to be provided with the appropriate ray and node data. This is achieved in the present embodiments by loading the ray and node data into respective (local) storage of and for the ray-node test units, in the form of (staging) registers, from where it can then be accessed/used by the ray-node test units accordingly.

Thus, as shown in FIG. 10, the ray data path unit 906 includes a ray data path unit node cache 908, which in the present embodiments is in the form of a set of (staging) registers for the ray-node test units 907, from which the node data is provided to the ray-node test units 907 (by appropriately providing the ray-node test circuits access to the appropriate registers when they require a particular node entry in the ray data path unit node cache 908).

As shown in FIG. 10, in the present embodiments, the ray data path unit node cache 908 has capacity to store data for one triangle node, one transform node, and eight box nodes. This is so as to match the testing capacity of the ray-node test units 907. Other numbers and combinations of types of node storable in the ray data path unit node cache 908 would, of course, be possible.

As shown in FIG. 10, the node data is loaded into the ray data path unit node cache 908 (registers) from the node data storage (SRAM) 904 of the overall node cache of the ray tracing unit 74. This is done by means of a ray data path unit node "handler" circuit 1107 that operates under the control of a node scheduling circuit of the node cache unit 905 (which will be discussed in more detail below). As shown in FIG. 10, as the node data store 904 of the ray tracing unit 74 has two (cache) banks, the system is configured such that node data from each one of the banks can be written into the ray data path unit node cache 908 in a given processing cycle (in parallel).

The ray data (the rays) to be tested by the ray-node testing circuits 907 is correspondingly stored in an appropriate set of ray (staging) registers 1108 from where the ray-node testing circuits can access that data. As shown in FIG. 10, the ray data is loaded into the staging registers 1108 from the ray data store 902. As shown in FIG. 10, and as discussed above, in the present embodiments the ray data store 902 is configured as four respective banks, and so four rays can be and are "staged" for processing (one from each bank of the ray data store) in a given processing cycle.

The loading of the rays into the ray staging registers 1108 is performed by a ray data path unit ray "handler" circuit 1109, which operates and does this under the control of a ray scheduling circuit of the node cache unit 905 (which will again be discussed in more detail below).

As shown in FIG. 10, the ray data path unit ray handler 1109 also controls which combination of ray and node data (which combination of ray and node data staging registers) is provided to a respective ray-node test unit (circuit) 907, so that the appropriate ray-node combinations are tested. Again this is done under the control of the ray scheduling circuit of the node cache unit 905 and will be described in more detail below.

As shown in FIG. 10, in the present embodiments, for the box node testing units 1101, 1102, 1103 and 1104, each of those circuits is configured to process a ray from a different respective ray staging register (and thus bank of the ray data store 902), and so the ray handler 1109 controls, for those ray-node testing circuits, which node is fed into a respective box node test circuit from the ray data path unit node cache 908, to control which ray and box node combination is tested. For the triangle node and transform node test circuits 1105 and 1106, the ray handler 1109 instead controls which of the four rays that are currently staged is provided to the relevant ray-node test circuit for testing.

FIG. 10 also shows that the ray data path unit 906 includes an appropriate ray write circuit 1110 for writing (e.g. updated) data for rays back to the ray data store 902 (as discussed above).

Figure 11:
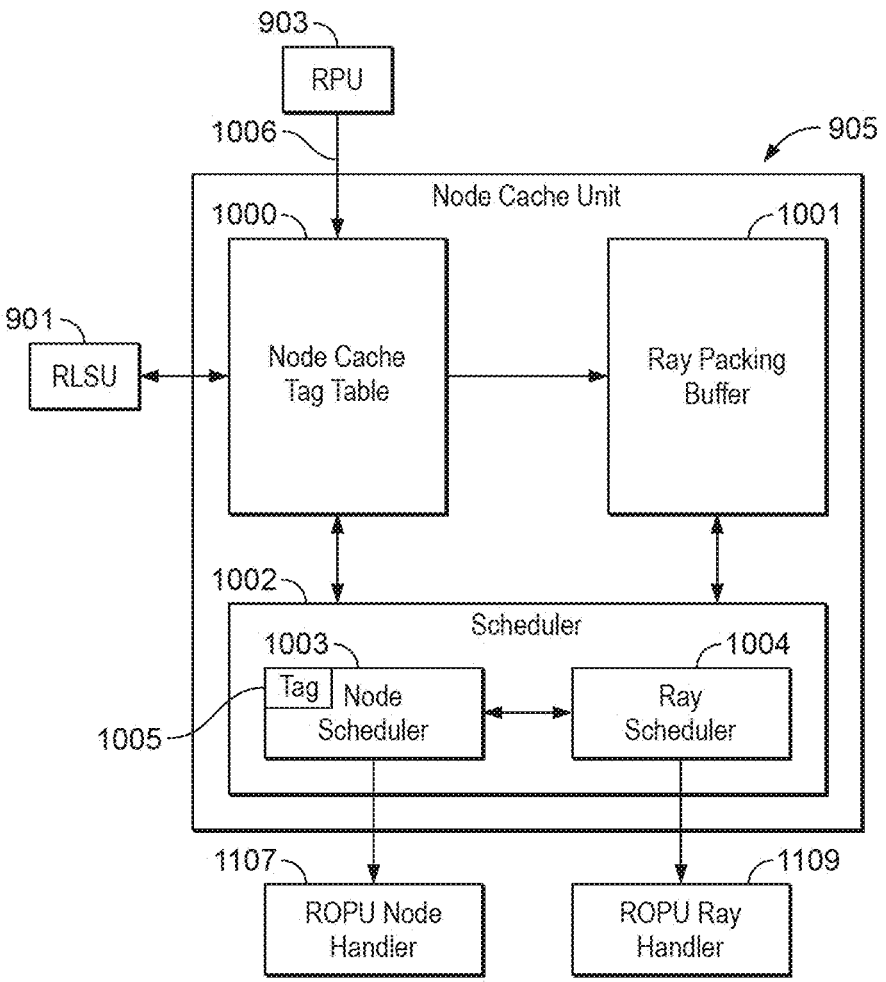
FIG. 11 shows the node cache unit of the ray tracing unit of FIG. 9 in more detail.

FIG. 11 shows the node cache unit 905 in more detail.

As discussed above, the node cache unit 905 is operable to ensure that the appropriate node and ray data is available for performing the appropriate ray node tests by the ray data path unit 906 when required, and, furthermore, for scheduling the ray-node tests on the ray data path unit 906.

As shown in FIG. 11, to facilitate this operation the node cache unit 905 includes a node cache tag table 1000, a ray parking buffer 1001, and a scheduler (scheduling circuit) 1002.

The node cache tag table 1000 is used to keep track of the ray tracing acceleration data structure nodes that are stored in the node data store (SRAM) 904 and to control the loading and eviction of node data in the node data store 904. This node cache tag table 1000 accordingly acts as the tag part for the node cache data store 904, and the combination of the node cache tag table 1000 and the node cache data store 904 forms and acts as a node cache of the ray tracing unit 74.

The node cache tag table 1000 stores tags identifying the nodes (the node data) that are stored in the node cache data store 904. It accordingly has a plurality of entries, one for each entry in the node cache data store 904 (so 256 entries in the present embodiment).

Each node cache tag table entry stores appropriate identifying data (a tag) for the node(s) that is stored in the node cache data store entry (cache line) in question (in the form of a (memory) address for the node (data)). In the present embodiment, as the node cache data store is configured as two banks (two sub-lines), each tag in the node cache tag table represents two sub-entries (two sub-lines) of 64 bytes of data in the node cache data store (one from each bank of the node cache data store 904). For a triangle or transform node the tag in the tag table will identify a full entry (line) (128 bytes of data) in the node cache data store. For a box node (non-end/leaf node) the tag in the tag table will identify two sub-lines of 64 bytes of data.

Correspondingly, a lookup search can be performed on two tag sizes, with one tag size being double the size of the other.

The node cache tag table is configured to be fully associative for tags of the larger size, and one-way associative for tags of the smaller size. Thus, in the present embodiments the cache tag table is fully associative for 256 tags of 128 bytes each (and configured as 256 lines of 128 bytes, each containing two sub-lines of 64 bytes), and one-way associative for 512 tags of 64 bytes (configured as 512 lines of 64 bytes, with each 64 byte line being allocated a sub-line of the 128 byte lines).

Each entry that is stored in the node cache tag table 1000 also stores, in addition to the identifier (tag) for the node it relates to, a set of other (meta) data for the node cache entry in question, which in the present embodiment indicates the state of the entry and other information regarding the content of the entry.

Thus, the node cache tag table manages the node cache, by storing the node's address and status.

In the present embodiments, each entry in the node cache tag table has:

a "valid" indicator to indicate whether the entry in the node cache is currently "valid" or not;

a node type indicator, indicating the type of node (triangle, transform, or box) that is stored in the node cache entry in question;

and for each "sub-line" (i.e. each bank of the entry):

an "exist in data store" indicator to indicate whether the corresponding node data is currently present (stored) in the (bank in question of) node cache data store 904;

a "needs requesting" indicator to indicate whether the relevant node data needs to be requested and fetched into the (bank in question of) node cache data store 904 from the memory system by the ray load store unit; and a "lock" indicator which can be set to prevent the corresponding entry in the (bank in question of) node data data store 904 from being evicted and is set when there is at least one ray in the parking buffer requiring the node in question;

Other arrangements and configurations would, of course, be possible.

The node cache tag table is configured to be able to process as many lookups per processing cycle as there will be ray node processing requests from the ray processing unit 903 (so in the present embodiments, the node cache tag table can handle and support an input rate from the ray processing unit 903 of four "node" lookups per processing cycle).

The cache tags are mutual to all the requests (each request can hit/miss the entire cache tags).

(Thus, when a new node request arrives at the cache tag table, it checks every entry in the table and decides if it's a hit or a miss.)

The node cache (the node cache tag table) is configured as a non-blocking cache that can support up to the maximum number of ray-node read requests that could be made (without blocking). Thus, as in the present embodiments the maximum number of rays that could be "live" at any one time is 128, the node cache tag table can support 128 node read requests without blocking.

(Thus, the node cache of the ray tracing unit 74 is configured as a non-blocking and fully multi-port cache, in the present embodiments having four ports without request limitations.)

Other arrangements would, of course, be possible.

The ray parking buffer (table) 1001 stores a record of rays waiting to be tested by the ray data path unit 906 (and thus acts as a pool of rays waiting to be tested). For each "parked" ray it stores the identity of the node that the ray is to be tested against (in the form of the (identity of the) relevant (tag) line in the cache tag table 1000 for the data of that node).

To do this, the ray parking buffer 1001 has an entry for each (internal) ray ID that can be allocated to a ray to be tested and for each ray ID stores an indication of the node that the ray (having that ID) is to be tested against, and an associated validity indicator (that is used to indicate whether (that) the ray having the ray ID in question is actually waiting to be tested against the indicated node or not).

Thus, when a new ray-node request arrives at the node cache unit 905, an identifier for the node being tested is written to the corresponding entry for the ray in question in the ray parking buffer and the "valid" indication set to indicate that that ray needs to be tested against the indicated node. Once the ray has been sent for testing against the node in question, the valid indication is unset to indicate that that ray entry no longer indicates a test that needs to be performed.

As in the present embodiments up to 128 rays can be being processed in the ray tracing unit at any one time, the ray parking buffer has 128 entries. The entries (the ray parking buffer 1001) are configured and divided per bank of the ray data store 902, such that parked rays from (and for) a given ray bank can be (easily) identified.

Correspondingly, as the ray processing unit 903 can make four ray-node test requests per processing cycle, four new entries can be allocated in the ray parking buffer per processing cycle.

Other arrangements for the ray parking buffer would, of course, be possible.

The scheduler (scheduling circuit) 1002 of the node cache unit 905 includes both a node scheduler (a node scheduling circuit) 1003 and a ray scheduler (a ray scheduling circuit) 1004. These scheduling circuits select and control which rays and nodes are loaded to the ray data path unit 906 for testing and are tested in the respective ray-node testing units (circuits) 907. As discussed above, to do this the node scheduler 1003 communicates with and controls the RDPU node handler 1107, and the ray scheduler 1004 communicates with and controls the RDPU ray handler 1108.

As shown in FIG. 11, and as discussed above, the node cache unit 905 receives appropriate "ray-node" test requests 1006 for rays to be tested from the ray processing unit 903. These requests identify the ray (ray ID) to be tested and the ray tracing acceleration data structure node that the ray is to be tested against. In the present embodiments, the RPU 903 sends a ray-node test request for each of the respective four different banks of the ray data store (SRAM) 902. Thus the RPU 903 sends four ray-node test requests 1006 to the node cache unit 905 in parallel.

In response to a ray-node test request for processing a node against a ray from the RPU 903, the node cache unit 905 checks the node cache tag table 1000 to determine whether the node in question is already present in the node data store (SRAM) 904 or not.

In the case of a "miss" (i.e. the node is not already present in the node cache data store 904), the node cache unit 905 triggers the loading of the node data into the node cache data store 904. Thus it allocates a new entry (line) in the node cache data store 904 for the node data, updates the corresponding entry in the node cache tag table 1000 accordingly, and issues a read request for the missing node (data) to the ray load store unit 910 (with the ray load store unit 910 then operating to load the appropriate node data into the allocated entry (line) in the node cache data store 904 and informing the node cache unit 905 accordingly). An existing line (entry) in the node cache may be appropriately evicted for this purpose.

The node cache unit 905 also correspondingly adds the ray to the ray parking buffer 1001 (i.e. writes the identifier for the node being tested to the corresponding entry for the ray in question in the ray parking buffer, and sets the "valid" indication for that entry to indicate that that ray needs to be tested against the indicated node)

In the case that a requested node is already indicated as being present in the node cache data store 904 when looked up in the cache tag table 1000 (a "hit"), then the node cache unit 905 "adds" the ray to the ray parking buffer 1001 (sets the entry for the ray in the ray parking buffer accordingly). In this case there is no need to request that the node be loaded into the node cache data store 904, as the node is already present in the node cache data store 904.

As discussed above, when new node data is to be loaded into the node cache data store, it may be necessary to evict an existing node (cache line) from that data store.

The node cache replacement policy in the present embodiments is configured such that cache entries (nodes) are locked (using the "lock" indication in the node cache tag table entry as discussed above) so that they cannot be evicted from the node cache while there is a ray currently in the ray parking buffer that is to be tested against the node in question. Then, for any entry (node) that is not locked for use by a current ray, a cache replacement policy is used to select a node (a cache entry) to be replaced (evicted).

The cache replacement policy in the present embodiment supports up to four misses in parallel (as that is the number of requests that can be received in parallel). In the present embodiment, a bit PLRU that can support plural (four) misses in parallel in one processing cycle replacement policy is used, but other replacement policies such as a tree PLRU policy that can support four misses in parallel, or a random replacement policy that can support four misses in parallel, could instead be used if desired.

Where there are multiple nodes to be fetched into the node cache data store 904 then the node(s) to be loaded in any given processing cycle can be selected from the indicated waiting nodes in any suitable and desired manner, for example by using a round robin selection process around all the nodes that the node cache tag table indicates are waiting to be fetched into the node cache data store 904.

The node scheduler (node scheduling circuit) 1003 of the node cache unit 905 selects and sets the ray tracing acceleration data structure nodes that are stored in the ray data path unit node cache (staging registers) 908.

To do this, the node scheduler 1003 receives as an input appropriate indications of ray tracing acceleration data structure nodes whose data exists in the node data store (SRAM) 904 and that at least one ray in the ray parking buffer is waiting to be tested against. The node scheduler 1003 then selects one node for every entry (staging register) in the ray data path unit node cache 908 based on this information, and causes the ray data path unit node handler 1107 to load the relevant node data into the selected entry in the ray data path unit node cache (staging registers) 908.

As shown in FIG. 11, the node scheduler 1003 also maintains a ray data path unit node cache tag table 1005, whereby it keeps track of which ray tracing acceleration data structure nodes are currently stored in the ray data path unit node cache (staging registers) 908.

The ray scheduler (ray scheduling circuit) 1004 correspondingly selects the rays to be provided to the staging registers 1008 of the ray data path unit 906 from the ray data store (SRAM) 902 for testing. As discussed above, one ray is selected for testing from each bank of the ray data store (SRAM) 902 (in a given processing cycle).

In order to select the rays to be processed next, the ray scheduler 1004 receives (from the node scheduler 1003) an indication of the ray tracing acceleration data structure nodes that are currently present in the ray data path unit node cache (staging registers) 908. The ray scheduler 1004 also receives an indication of the rays from each bank of the ray cache 902, respectively, that are currently present in the ray parking buffer 1001 and awaiting testing. For each set of rays (corresponding to a given bank of the ray cache 902) in the ray parking buffer 1001 waiting to be tested, the ray scheduler identifies those rays that are to be tested against a node that is present in the ray data path unit node cache (staging registers) 908 (based on the information from the node scheduler 1003), and then selects one ray from the parking buffer for each ray cache bank for processing next accordingly.

The ray scheduler 1004 then indicates the selected rays (one from each bank of the ray cache 902) together with an indication of the node stored in the ray data path unit node cache (staging registers) 908 that the ray is to be tested against (e.g., and in an embodiment, in terms of the location of (the entry/register for) the node in the ray data path unit node cache 908) to the ray data path unit ray handler 1109, so that the ray data path unit ray handler 1109 can allocate the appropriate ray-node combination to the required ray-node test unit of the ray data path unit.

Figure 12:
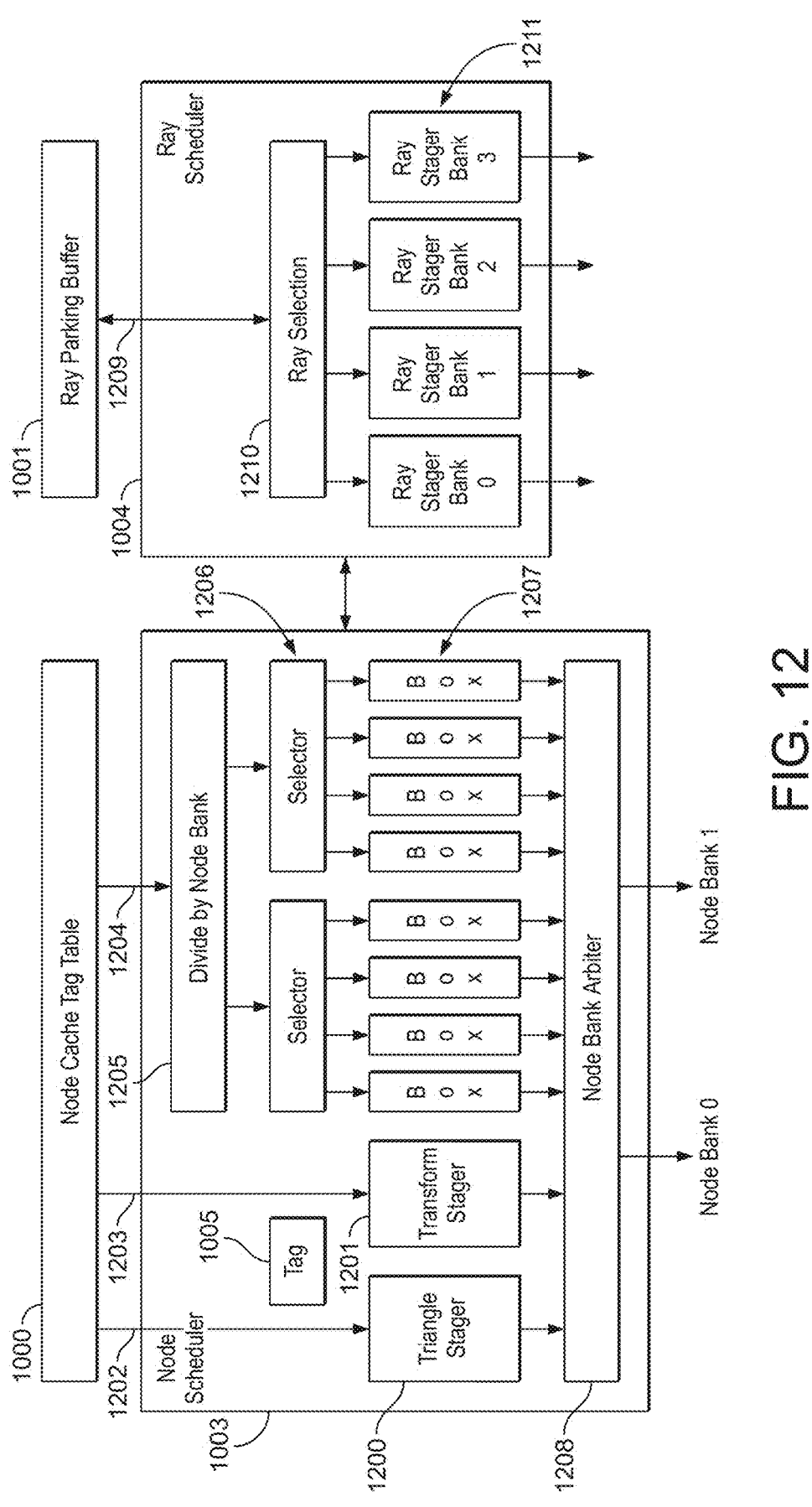
FIG. 12 shows the scheduling circuit of the node cache unit of FIG. 11 in more detail.

FIG. 12 shows the node scheduler 1003 and ray scheduler 1004 in more detail.

As discussed above, the node scheduler 1003 determines which nodes are loaded into and present in the ray data path unit node cache (stage registers) 908.

As discussed above, in the present embodiments the ray data path unit node cache (staged registers) 908 can store (has entries for) eight different box nodes, one triangle node, and one transform node in.

In the present embodiments, the different banks of the node cache data store (SRAM) 904 are associated with a predetermined and fixed set of the entries (state registers) in the ray data path unit node cache 908 (i.e. there is a fixed mapping between the node cache data store SRAM banks and respective entries in the ray data path unit node cache 908).

In particular, four of the box node entries in the ray data path unit node cache 908 are mapped to one bank of the node cache data store and the other four of the box node entries in the ray data path unit node cache 908 are mapped to the other bank of the node cache data store. The MSB "half" of a triangle node is mapped to one bank of the node cache data store, with the LSB "half" of the node correspondingly mapped to the other bank of the node cache data store. The MSB "half" of a transform node is mapped to one bank of the node cache data store, with the LSB "half" of the node correspondingly mapped to the other bank of the node cache data store. (Correspondingly, in the case of allocating a triangle or transform node into the ray data path unit node cache (stage registers) 908, then the two parts of data for the node (one from each bank) can be read in parallel or at different times from the two different banks of the node cache data store (SRAM) 904.)

The node scheduler is configured to not replace any nodes stored in the ray data path unit node cache (stage registers) 908 until all the rays in the ray parking buffer 1001 that are to be tested against that node have been tested against that node. This is achieved by indicating respective entries in the ray data path unit node cache 908 as being "locked" and thus unable to be changed in the ray data path unit node cache tag table 1005.

In order to select the nodes whose data is loaded into the ray data path unit cache 908 (into the staging registers of the ray data path unit), the node scheduler receives as inputs: a list 1202 of all the triangle nodes that are currently stored in the node cache data store 904 and for which there is a ray currently awaiting testing against that node in the ray parking buffer 1001 (i.e. of all the triangle nodes for which the node cache tag table 1000 indicates the data (validly) exists in the node cache data store 904, and that are "locked" for testing against a ray); a list 1203 of all the transform nodes that are currently stored in the node cache data store 904 and for which there is a ray currently awaiting testing against that node in the ray parking buffer 1001 (i.e. of all the transform nodes for which the node cache tag table 1000 indicates the data (validly) exists in the node cache data store 904, and that are "locked" for testing against a ray); and a list 1204 of all the box nodes that are currently stored in the node cache data store 904 and for which there is a ray currently awaiting testing against that node in the ray parking buffer 1001 (i.e. of all the box nodes for which the node cache tag table 1000 indicates the data (validly) exists in the node cache data store 904, and that are "locked" for testing against a ray).

These lists effectively therefore indicate the triangle, transform, and box nodes that need to be loaded into the ray data path unit node cache 908 for testing against rays waiting to be tested. This information can be provided in any suitable and desired manner, for example in the form of an appropriate "node" bit vector.

The node scheduler then selects, in the case of a triangle node, a next triangle node to load into the ray data path unit node cache 908 entry for that type of node from the list 1202 of triangle nodes to be tested, in the present embodiments in a round robin manner (i.e. such that triangle nodes will be selected for loading into the ray data path unit node cache 908 from the list of triangle nodes to be tested one after another in a round robin manner).

As shown in FIG. 12, the list of triangle nodes to be loaded into the ray data path unit node cache 908 is provided to a triangle stager circuit 1200 which then performs the round robin selection of the triangle node to be loaded next into the ray data path unit node cache 908.

In the case of a transform node, the node scheduler then selects a next transform node to load into the ray data path unit node cache 908 entry for that type of node from the list 1203 of transform nodes to be tested, in the present embodiments again in a round robin manner (i.e. such that transform nodes will be selected for loading into the ray data path unit node cache 908 from the list of transform nodes to be tested one after another in a round robin manner).

As shown in FIG. 12, the list 1203 of transform nodes to be loaded into the ray data path unit node cache 908 is provided to a transform stager circuit 1200 which then performs the round robin selection of the transform node to be loaded next into the ray data path unit node cache 908.

In the case of box nodes, as there are eight entries in the ray data path unit node cache 908 for storing box nodes, with those entries, as discussed above, respectively split between the two banks of the node cache data store 904, (up to) eight box nodes, one for each entry in the ray data path unit node cache, are selected for loading into the ray data path unit node cache 908 by the node scheduler 1003, four for each bank of the node cache data store 904.

Thus, as shown in FIG. 12, the list 1204 of box nodes to be loaded into the ray data path unit node cache 908 is first sub-divided by their respective node banks by a node bank arbiter 1205, and an appropriate node selector 1206 then selects four box nodes to be loaded into the ray data path unit node cache 908 from each respective node bank list of box nodes to be loaded. Again, in the present embodiments, the four box nodes selected for a given node bank are selected from the list of box nodes for that node bank in a round robin fashion.

Other arrangements would be possible in this regard. For example, instead of first sub-dividing the nodes to be loaded by node bank and then selecting four nodes from each node bank in a round robin fashion, the overall list of box nodes to be loaded into the ray data path unit node cache 908 could be divided into respective individual lists for each different box node entry in the ray data path unit node cache 908, with the box node to load into each individual entry then being selected in a round robin fashion from the list for that specific node entry in the ray data path unit node cache 908.

The selected box nodes are then allocated to a respective box node stager 1207 as shown in FIG. 12.

The node scheduler 1003 will accordingly select at any one time, one triangle node, one transform node, and eight box nodes, to be loaded next into the ray data path unit node cache (staging registers) 908.

As, as discussed above, in the present embodiments it is only possible to read two sets of node data (one from each bank) from the node cache data store 904 in any given processing cycle, it is not possible to read data for all ten selected nodes into the ray data path unit node cache (stage registers) 908 in the same processing cycle. Accordingly, the node scheduler 1003 includes a further node bank arbiter (selector) 1208 that operates to select which actual node data is loaded into the ray data path unit node cache 908 in any given processing cycle.

To do this, the node bank arbiter receives two sets of inputs, one for each bank of the node cache data store 904, with each set of inputs for a given node data store bank comprising the identity of the triangle node, the transform node, and the four box nodes to be loaded next from that bank (i.e. up to six nodes to select between). The node bank arbiter 1208 then selects the node data to be loaded into the ray data path unit node cache 908 from the node cache data store bank in question from the relevant (six) inputs in a round robin fashion.

The node bank arbiter 1208 then signals the ray data path unit node handler 1107 (FIG. 10) to load the appropriate node data from the two banks of the node cache data store 904 into the appropriate entries in the ray data path unit node cache (stage registers) 908.

When data for a node is loaded into the ray data path unit node cache 908, the corresponding record for that entry in the ray data path unit node cache 908 is indicated as being "locked" in the ray data path unit node cache tag table 1005, so that that node data can be retained in the ray data path unit node cache 908 until there are no more rays in the ray parking buffer to be tested against that node data. Correspondingly, and as will be discussed further below, when the ray scheduler 1004 sends the last ray from the ray parking buffer 1001 to be tested against a node, it indicates that to the node scheduler 1003 so that the node scheduler can "unlock" that entry in the ray data path unit node cache 908 and allocate and load a new node into that entry in the ray data path unit node cache 908.

As discussed above, the ray scheduler 1004 determines which rays are loaded into and present in the ray data path unit ray data stores (staging registers) and controls the ray-node combinations that are tested in the ray data path unit.

The ray scheduler is configured to only drive new rays into the ray data path unit ray node testing circuits if their nodes to be tested against are present in the ray data path unit node cache 908.

As ray data path unit only has a single triangle node test unit and a single transform node test unit, the ray scheduler operates to select for processing at most only one ray to be tested against a triangle node in any given processing cycle, and correspondingly, only one ray to be tested against a transform node in any given processing cycle.

The ray scheduler 1004 is operable to select one ray for loading and testing from each ray store bank in a given processing cycle, and operates so far as possible, to ensure that four rays are selected and tested in each processing cycle (one from each ray store bank). (Thus, the ray scheduler 1004 selects (wherever possible) one ray to be tested against a node from each of the four banks of the ray data store 902 (as four rays, one from each bank, can be read from the ray data store 902 in a given processing cycle).)

To select the rays to be loaded and tested, the ray scheduler 1004 receives, for each respective bank of the ray data store 902, a list of rays that are waiting in the ray parking buffer 1001 to be tested for that bank.

The list of rays to be tested for a bank that is provided to the ray scheduler 1004 in this regard indicates for each ray, the ray tracing acceleration data structure node that the ray is to be tested against (in the form of the tag ID for the node) and the type of node that the ray is to be tested against.

The ray scheduler also receives as an input an indication of the nodes that are currently stored (staged) in the ray data path unit node cache (staging registers) 908 (from the node scheduler 1003).

A ray selection unit (circuit) 1210 of the ray scheduler 1004 then selects a ray to be tested next for each bank of the ray data store 902 using this information, and allocates the selected ray to a corresponding ray stager 1211 for the bank in question.

The ray selection unit 1210 uses the "currently staged" nodes indication and the list of rays to be tested for a given ray store bank, to determine for each node that is currently present in the ray data path unit node cache 908, a list of (zero or more) rays (a list of "candidate" rays) for the ray bank in question to be tested against the node in question (thereby to identify rays from the ray store bank in question that can currently be tested against a, and each, node in the ray data path unit node cache 908).

This is done for each bank of the ray data store 902.

The ray selection unit 1210 then selects in a round robin fashion a next ray (if any) to be tested from the ray bank in question for each of the node entries in the ray data path unit node cache 908. It does this for each of the four banks of the ray data store 902, and so will accordingly identify and select (where present) (up to) four "candidate" rays (one from each bank) for testing against the triangle node that is stored in the ray data path unit node cache, (up to) four "candidate" rays (one from each bank) for testing against the transform node that is stored in the ray data path unit cache 908, and (up to) thirty-two "candidate" rays ((up to) eight from each ray data store bank) for testing against the box nodes stored in the ray data path unit cache 908.

The ray selection unit 1210 then performs a further selection from these "candidate" rays for testing to select the actual four rays, one from each bank, that will be sent to the ray data path unit 906 for testing next.

The ray selection unit 1210 of the ray scheduler 1004 operates to select rays for processing by prioritising testing against a triangle node as the highest priority, followed by testing against a transform node as the second highest priority, and then testing against a box node as the lowest priority. Thus the ray scheduler will, so far as possible, try to ensure that a ray to be tested against the triangle node in the ray data path unit node cache 908 is selected for testing in any given processing cycle, and then once a ray for testing against that triangle node has been selected (if possible), then select a ray for testing against the transform node in the ray data path unit node cache 908 (if possible), and then thereafter select rays for testing against box nodes stored in the ray data path unit node cache 908.

When selecting from the candidate rays for testing against a given node in the ray data path unit node cache 908 the next ray to test against that node from the list of candidate rays for testing against that node subject, the ray selection unit 1210 also avoids selecting (does not select) a ray from a bank from which a ray has has already been selected for testing next (as only one ray from each bank can be selected for testing in any given processing cycle).

To achieve this, the ray selection unit 1210 firstly selects from the list of candidate rays for testing against the triangle node that is stored in the ray data path unit node cache 908, the next ray to test against that triangle node (in a round robin fashion).

It then selects the next ray, if any, to test against the transform node stored in the ray data path unit node cache 908 from the candidate list of rays to be tested against that node (in a round robin fashion) (but avoiding a ray from the bank of the ray data store 902 for which a ray has already been selected for testing against the triangle node in the ray data path unit node cache 908).

Once a ray or rays to be tested against the triangle node and/or transform node stored in the ray data path unit node cache 908 have been selected, for any remaining ray store banks for which a ray has not yet been selected, an appropriate box node stored in the ray data path unit node cache 908 for testing against rays from the bank in question is selected (again in a round robin fashion where there are plural box nodes available to be tested against rays from the bank in question), and then a ray from the bank in question to be tested against the selected box node is selected in a round robin fashion from the list of rays from the bank in question waiting to be tested against that box node.

The rays selected for testing next are then allocated to a respective ray stager 1214 for the ray store bank in question, and the ray data path unit ray handler 1109 (FIG. 10) is signalled by those stagers to load the appropriate rays into the ray staging registers of the ray data path unit and to cause the rays to be tested against the desired nodes in the ray data path unit node cache 908.

Once a ray has been sent for testing by the ray data path unit 906, the ray scheduler 1004 correspondingly signals the ray parking buffer 1001 to "remove" the ray in question from the ray parking buffer 1001 (i.e. to set the entry for the ray in the ray parking buffer 1001 to indicate that the ray is not still waiting to undergo the node test in question).

When the last ray (in the ray parking buffer) for testing against a node currently stored in the ray data path unit node cache 908 has been selected and sent for testing by the ray scheduler 1004, the ray scheduler signals that to the node scheduler 1003 and to the node cache tag table 1000, so that the node scheduler 1003 can then identify that the node has been finished with and so can be replaced in the ray data path unit node cache 908 with a new node (so it can then allocate a new node to the entry in the ray data path unit node cache 908 in question), and the node cache tag table 1000 can be updated to indicate that the data for the node in question can be evicted from the node cache data store 904.

It can be seen from the above that the technology described herein, in its embodiments at least, can provide a more efficient process for performing ray tracing-based rendering. This is achieved, in the embodiments of the technology described herein at least, by using a ray tracing circuit to perform ray traversals, which ray tracing circuit includes a ray testing circuit for performing ray-node tests for rays being processed. The ray testing circuit includes local storage for storing nodes of ray tracing acceleration data structures that rays are to be tested against, with the rays being selected for testing based on the nodes that are stored in the local storage of the ray testing circuit.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when rendering a frame that represents a view of a scene using a ray tracing process;

wherein the ray tracing process uses a ray tracing acceleration data structure indicative of the distribution of geometry for the scene to be rendered to determine geometry for the scene that may be intersected by a ray, the ray tracing acceleration data structure comprising a plurality of nodes, each node associated with a respective one or more volumes within the scene;

the graphics processor comprising:

a ray tracing circuit operable to test rays against a ray tracing acceleration data structure for a ray tracing process;

the ray tracing circuit comprising:

a ray testing circuit operable to perform ray intersection tests for nodes of a ray tracing acceleration data structure;

storage local to the ray testing circuit for storing data representative of one or more nodes of a ray tracing acceleration data structure for use by the ray testing circuit when testing rays against a ray tracing acceleration data structure for a ray tracing process;

a ray tracing acceleration data structure node scheduling circuit operable to cause nodes of a ray tracing acceleration data structure to be stored in the local storage of the ray testing circuit for use by the ray testing circuit; and a ray scheduling circuit configured to select rays for testing against nodes of a ray tracing acceleration data structure by the ray testing circuit from a pool of one or more rays to be tested against a node of a ray tracing acceleration data structure;

the method comprising:

when the ray tracing circuit is to perform ray tracing intersection test operations for rays using a ray tracing acceleration data structure:

the ray tracing acceleration data structure node scheduling circuit causing data representative of a node or nodes of the ray tracing acceleration data structure to be stored in the local storage of the ray testing circuit;

providing an indication of the ray tracing acceleration data structure node or nodes that have been stored in the local storage of the ray testing circuit to the ray scheduling circuit; and the ray scheduling circuit:

selecting from a pool of one or more rays to be tested against the ray tracing acceleration data structure a ray or rays to be tested against a node or nodes of the ray tracing acceleration data structure by the ray testing circuit, based on the indication of the node or nodes of the ray tracing acceleration data structure that have been stored in the local storage of the ray testing circuit; and causing the selected ray or rays to be tested against a node or nodes of the ray tracing acceleration data structure by the ray testing circuit.

2. The method of claim 1, wherein the ray tracing circuit further comprises a cache for storing data of nodes of ray tracing acceleration data structures; and the method comprises:

loading the node data into the local storage of the ray testing circuit for use by the ray testing circuit from that cache of the ray tracing circuit.

3. The method of claim 2, wherein the cache for storing data of nodes of ray tracing acceleration data structures of the ray tracing circuit has an associated tag table for tracking the ray tracing acceleration data structure nodes that are stored in the cache, and the cache is fully associative at least for tags of a particular size.

4. The method of claim 2, wherein the ray testing circuit performs plural ray node intersection tests in parallel and the node cache of the ray tracing circuit is configured to be able to process as many lookups in parallel as there can be ray node intersection tests in parallel.

5. The method of claim 2, comprising selecting the ray tracing acceleration data structure nodes that are stored in the ray testing circuit local node storage from the ray tracing circuit node cache based on the ray tracing acceleration data structure nodes whose data is stored in the ray tracing circuit node cache and the nodes that rays in the ray pool are waiting to be tested against.

6. The method of claim 1, wherein the pool of rays to be tested stores a record of rays to be tested by the ray testing circuit of the ray tracing circuit, and for each ray in the pool, identifies the ray and the node of a ray tracing acceleration data structure that the ray is to be tested against; and the method comprises:

adding a ray to the pool of rays for testing when the ray is to be tested against a node of a ray tracing acceleration data structure as part of the traversal of the ray through a ray tracing acceleration data structure that the ray tracing circuit is performing.

7. The method of claim 1, comprising selecting from the pool of one or more rays to be tested against the ray tracing acceleration data structure a ray or rays to be tested against a node or nodes of the ray tracing acceleration data structure by the ray testing circuit, based on the indication of the node or nodes of the ray tracing acceleration data structure that have been stored in the local storage of the ray testing circuit by:

identifying those rays in the pool of rays to be tested that are to be tested against a node that is indicated as being present in the ray testing circuit local node storage, and then selecting a ray or rays for testing from those identified rays.

8. The method of claim 1, wherein the selecting of a ray or rays for testing from the pool of rays is configured to prioritise testing of rays against a particular type of node over nodes of a different type.

9. The method of claim 1, comprising selecting plural rays from the ray pool for testing against different nodes stored in the ray testing circuit local node storage by the ray testing circuit in parallel.

10. A graphics processor operable to render frames that represent a view of a scene using a ray tracing process;

wherein the ray tracing process uses a ray tracing acceleration data structure indicative of the distribution of geometry for the scene to be rendered to determine geometry for the scene that may be intersected by a ray, the ray tracing acceleration data structure comprising a plurality of nodes, each node associated with a respective one or more volumes within the scene;

the graphics processor comprising:

a ray tracing circuit operable to test rays against a ray tracing acceleration data structure for a ray tracing process;

the ray tracing circuit comprising:

a ray testing circuit operable to perform ray intersection tests for nodes of a ray tracing acceleration data structure;

storage local to the ray testing circuit for storing data representative of one or more nodes of a ray tracing acceleration data structure for use by the ray testing circuit when testing rays against a ray tracing acceleration data structure for a ray tracing process;

a ray tracing acceleration data structure node scheduling circuit configured to cause nodes of a ray tracing acceleration data structure to be stored in the local storage of the ray testing circuit for use by the ray testing circuit; and a ray scheduling circuit configured to select rays for testing against a ray tracing acceleration data structure by the ray testing circuit from a pool of one or more rays to be tested against a node of a ray tracing acceleration data structure;

wherein:

the ray tracing acceleration data structure node scheduling circuit is configured to, when the ray tracing circuit is to perform ray tracing intersection test operations for rays using a ray tracing acceleration data structure, cause data representative of a node or nodes of the ray tracing acceleration data structure to be stored in the local storage of the ray testing circuit;

the graphics processor further comprises:

a processing circuit configured to provide an indication of the ray tracing acceleration data structure node or nodes that have been stored in the local storage of the ray testing circuit to the ray scheduling circuit; and the ray scheduling circuit is configured to:

select from a pool of one or more rays to be tested against the ray tracing acceleration data structure a ray or rays to be tested against a node or nodes of the ray tracing acceleration data structure by the ray testing circuit, based on an indication of the node or nodes of the ray tracing acceleration data structure that have been stored in the local storage of the ray testing circuit provided to the ray scheduling circuit; and cause the selected ray or rays to be tested against a node or nodes of the ray tracing acceleration data structure by the ray testing circuit.

11. The graphics processor of claim 10, wherein the ray tracing circuit further comprises a cache for storing data of nodes of ray tracing acceleration data structures; and the node scheduling circuit is configured to cause:

node data to be loaded into the local storage of the ray testing circuit for use by the ray testing circuit from that cache of the ray tracing circuit.

12. The graphics processor of claim 11, wherein the cache for storing data of nodes of ray tracing acceleration data structures of the ray tracing circuit has an associated tag table for tracking the ray tracing acceleration data structure nodes that are stored in the cache, and the cache is fully associative at least for tags of a particular size.

13. The graphics processor of claim 11, wherein the ray testing circuit is configured to perform plural ray node intersection tests in parallel and the node cache of the ray tracing circuit is configured to be able to process as many lookups in parallel as there can be ray node intersection tests in parallel.

14. The graphics processor of claim 11, wherein the node scheduling circuit is configured to select the ray tracing acceleration data structure nodes that are stored in the ray testing circuit local node storage from the ray tracing circuit node cache based on the ray tracing acceleration data structure nodes whose data is stored in the ray tracing circuit node cache and the nodes that rays in the ray pool are waiting to be tested against.

15. The graphics processor of claim 10, wherein the pool of rays to be tested stores a record of rays to be tested by the ray testing circuit of the ray tracing circuit, and for each ray in the pool, identifies the ray and the node of a ray tracing acceleration data structure that the ray is to be tested against; and the graphics processor further comprises:

a ray traversal circuit configured to add a ray to the pool of rays for testing when a ray is to be tested against a node of a ray tracing acceleration data structure as part of the traversal of the ray through a ray tracing acceleration data structure that the ray tracing circuit is performing.

16. The graphics processor of claim 10, wherein the ray scheduling circuit is configured to select from the pool of one or more rays to be tested against the ray tracing acceleration data structure a ray or rays to be tested against a node or nodes of a ray tracing acceleration data structure by the ray testing circuit, based on the indication of the node or nodes of the ray tracing acceleration data structure that have been stored in the local storage of the ray testing circuit by:

identifying those rays in the pool of rays to be tested that are to be tested against a node that is indicated as being present in the ray testing circuit local node storage, and then selecting a ray or rays for testing from those identified rays.

17. The graphics processor of claim 10, wherein the ray scheduling circuit is configured to prioritise testing of rays against a particular type of node over nodes of a different type.

18. The graphics processor of claim 10, wherein the ray scheduling circuit is configured to select plural rays from the ray pool for testing against different nodes stored in the ray testing circuit local node storage by the ray testing circuit in parallel.

19. A non-transitory computer readable storage medium storing computer software code which when executing on one or more processors performs a method of operating a graphics processor when rendering a frame that represents a view of a scene using a ray tracing process;

wherein the ray tracing process uses a ray tracing acceleration data structure indicative of the distribution of geometry for the scene to be rendered to determine geometry for the scene that may be intersected by a ray, the ray tracing acceleration data structure comprising a plurality of nodes, each node associated with a respective one or more volumes within the scene;

the graphics processor comprising:

a ray tracing circuit operable to test rays against a ray tracing acceleration data structure for a ray tracing process;

the ray tracing circuit comprising:

a ray testing circuit operable to perform ray intersection tests for nodes of a ray tracing acceleration data structure;

storage local to the ray testing circuit for storing data representative of one or more nodes of a ray tracing acceleration data structure for use by the ray testing circuit when testing rays against a ray tracing acceleration data structure for a ray tracing process;

a ray tracing acceleration data structure node scheduling circuit operable to cause nodes of a ray tracing acceleration data structure to be stored in the local storage of the ray testing circuit for use by the ray testing circuit; and a ray scheduling circuit configured to select rays for testing against nodes of a ray tracing acceleration data structure by the ray testing circuit from a pool of one or more rays to be tested against a node of a ray tracing acceleration data structure;

the method comprising:

when the ray tracing circuit is to perform ray tracing intersection test operations for rays using a ray tracing acceleration data structure:

the ray tracing acceleration data structure node scheduling circuit causing data representative of a node or nodes of the ray tracing acceleration data structure to be stored in the local storage of the ray testing circuit;

providing an indication of the ray tracing acceleration data structure node or nodes that have been stored in the local storage of the ray testing circuit to the ray scheduling circuit; and the ray scheduling circuit:

selecting from a pool of one or more rays to be tested against the ray tracing acceleration data structure a ray or rays to be tested against a node or nodes of the ray tracing acceleration data structure by the ray testing circuit, based on the indication of the node or nodes of the ray tracing acceleration data structure that have been stored in the local storage of the ray testing circuit; and causing the selected ray or rays to be tested against a node or nodes of the ray tracing acceleration data structure by the ray testing circuit.

\*  \*  \*  \*  \*